(12) United States Patent
Liu et al.

(10) Patent No.: US 10,897,586 B2
(45) Date of Patent: Jan. 19, 2021

(54) GLOBAL SHUTTER IMAGE SENSOR

(71) Applicant: Facebook Technologies, LLC, Menlo Park, CA (US)

(72) Inventors: Xinqiao Liu, Medina, WA (US); Song Chen, Redmond, WA (US); Andrew Samuel Berkovich, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/454,787

(22) Filed: Jun. 27, 2019

(65) Prior Publication Data

US 2020/0007798 A1 Jan. 2, 2020

Related U.S. Application Data

(60) Provisional application No. 62/691,223, filed on Jun. 28, 2018.

(51) Int. Cl.
*H04N 5/335* (2011.01)
*H04N 5/353* (2011.01)
(Continued)

(52) U.S. Cl.
CPC ............. *H04N 5/353* (2013.01); *G01J 1/44* (2013.01); *H04N 5/378* (2013.01); *H04N 5/37452* (2013.01); *G01J 2001/4413* (2013.01)

(58) Field of Classification Search
CPC ........ H04N 5/353; H04N 5/37452; G01J 1/44
(Continued)

(56) References Cited

U.S. PATENT DOCUMENTS 4,596,977 A 6/1986 Bauman et al.
6,522,395 B1 2/2003 Bamji et al.
(Continued)

FOREIGN PATENT DOCUMENTS

DE 202016105510 10/2016
EP 1681856 A2 7/2006
(Continued)

OTHER PUBLICATIONS

U.S. Appl. No. 16/431,693, Non-Final Office Action dated Jan. 30, 2020, 6 pages.
(Continued)

*Primary Examiner* — Usman A Khan
(74) *Attorney, Agent, or Firm* — Kilpatrick Townsend & Stockton, LLP

(57) ABSTRACT

In one example, a method comprises: enabling a photodiode to, in response to incident light, accumulate residual charge, and to transfer overflow charge to a first charge storage device and a second charge storage device when the photodiode saturates; disconnecting the second charge storage device from the first charge storage device; enabling the photodiode to transfer the residual charge to the first charge storage device to cause the charge sensing unit to output a first voltage; quantizing the first voltage to generate a first digital value to measure the residual charge; connecting the second charge storage device with the first charge storage device to cause the charge sensing unit to output a second voltage; quantizing the second voltage to generate a second digital value to measure the overflow charge; and generating a digital representation of the incident light intensity based on the first digital value and the second digital value.

20 Claims, 21 Drawing Sheets

(51) Int. Cl.
    *G01J 1/44* (2006.01)
    *H04N 5/3745* (2011.01)
    *H04N 5/378* (2011.01)

(58) Field of Classification Search
    USPC ........................................................ 348/297
    See application file for complete search history.

(56) References Cited

U.S. PATENT DOCUMENTS

| | | |
|---|---|---|
| 6,529,241 B1 | 3/2003 | Clark |
| 7,659,772 B2 | 2/2010 | Nomura et al. |
| 7,719,589 B2 | 5/2010 | Turchetta et al. |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,094,629 B2 | 7/2015 | Ishibashi |
| 9,274,151 B2 | 3/2016 | Lee et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,819,885 B2 | 11/2017 | Furukawa et al. |
| 9,909,922 B2 | 3/2018 | Schweickert et al. |
| 9,967,496 B2 | 5/2018 | Ayers et al. |
| 10,003,759 B2 | 6/2018 | Fan |
| 10,419,701 B2 | 9/2019 | Liu |
| 10,574,925 B2 | 2/2020 | Otaka |
| 10,598,546 B2 | 3/2020 | Liu |
| 10,608,101 B2 | 3/2020 | Liu |
| 10,686,996 B2 | 6/2020 | Liu |
| 2003/0020100 A1 | 1/2003 | Guidash |
| 2003/0049925 A1 | 3/2003 | Layman et al. |
| 2004/0095495 A1 | 5/2004 | Inokuma et al. |
| 2005/0057389 A1 | 3/2005 | Krymski |
| 2005/0104983 A1 | 5/2005 | Raynor |
| 2006/0023109 A1 | 2/2006 | Mabuchi et al. |
| 2007/0076481 A1 | 4/2007 | Tennant |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0088014 A1 | 4/2008 | Adkisson et al. |
| 2008/0191791 A1 | 8/2008 | Nomura et al. |
| 2008/0226183 A1* | 9/2008 | Lei ..................... H04N 19/159 382/233 |
| 2009/0224139 A1 | 9/2009 | Buettgen et al. |
| 2010/0013969 A1 | 1/2010 | Ui |
| 2010/0276572 A1 | 11/2010 | Iwabuchi et al. |
| 2011/0049589 A1 | 3/2011 | Chuang et al. |
| 2011/0254986 A1 | 10/2011 | Nishimura et al. |
| 2012/0068051 A1 | 3/2012 | Ahn et al. |
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0262616 A1 | 10/2012 | Sa et al. |
| 2012/0273654 A1 | 11/2012 | Hynecek et al. |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0207219 A1 | 8/2013 | Ahn |
| 2013/0214371 A1 | 8/2013 | Asatsuma et al. |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0085523 A1 | 3/2014 | Hynecek |
| 2014/0176770 A1 | 6/2014 | Kondo |
| 2014/0232890 A1 | 8/2014 | Yoo et al. |
| 2014/0306276 A1 | 10/2014 | Yamaguchi |
| 2015/0090863 A1 | 4/2015 | Mansoorian et al. |
| 2015/0172574 A1 | 6/2015 | Honda et al. |
| 2015/0189209 A1 | 7/2015 | Yang et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0312502 A1 | 10/2015 | Borremans |
| 2015/0350582 A1 | 12/2015 | Korobov et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0088253 A1 | 3/2016 | Tezuka |
| 2016/0100115 A1 | 4/2016 | Kusano |
| 2016/0112626 A1 | 4/2016 | Shimada |
| 2016/0118992 A1 | 4/2016 | Milkov |
| 2016/0165160 A1 | 6/2016 | Hseih et al. |
| 2016/0240570 A1 | 8/2016 | Barna et al. |
| 2016/0249004 A1 | 8/2016 | Saeki et al. |
| 2016/0337605 A1 | 11/2016 | Ito |
| 2016/0360127 A1 | 12/2016 | Dierickx et al. |
| 2017/0013215 A1 | 1/2017 | McCarten |
| 2017/0053962 A1 | 2/2017 | Oh et al. |
| 2017/0062501 A1 | 3/2017 | Velichko et al. |
| 2017/0069363 A1 | 3/2017 | Baker |
| 2017/0099446 A1 | 4/2017 | Cremers et al. |
| 2017/0104021 A1 | 4/2017 | Park et al. |
| 2017/0104946 A1 | 4/2017 | Hong |
| 2017/0141147 A1 | 5/2017 | Raynor |
| 2017/0170223 A1 | 6/2017 | Hynecek et al. |
| 2017/0359497 A1 | 12/2017 | Mandelli et al. |
| 2018/0019269 A1 | 1/2018 | Klipstein |
| 2018/0077368 A1 | 3/2018 | Suzuki |
| 2018/0152650 A1 | 5/2018 | Sakakibara et al. |
| 2018/0220093 A1 | 8/2018 | Murao et al. |
| 2018/0376046 A1 | 12/2018 | Liu |
| 2019/0052788 A1 | 2/2019 | Liu |
| 2019/0056264 A1 | 2/2019 | Liu |
| 2019/0057995 A1 | 2/2019 | Liu |
| 2019/0058058 A1 | 2/2019 | Liu |
| 2019/0104263 A1 | 4/2019 | Ochiai et al. |
| 2019/0104265 A1 | 4/2019 | Totsuka et al. |
| 2019/0157330 A1 | 5/2019 | Sato et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0371845 A1 | 12/2019 | Chen et al. |
| 2019/0379827 A1* | 12/2019 | Berkovich ......... H04N 5/23254 |
| 2020/0007800 A1* | 1/2020 | Berkovich ........... H04N 5/3559 |
| 2020/0068189 A1* | 2/2020 | Chen ................... H04N 13/286 |

FOREIGN PATENT DOCUMENTS

| | | |
|---|---|---|
| EP | 1732134 | 12/2006 |
| EP | 1746820 | 1/2007 |
| EP | 2538664 | 12/2012 |
| EP | 2833619 A1 | 2/2015 |
| EP | 3258683 A1 | 12/2017 |
| EP | 3425352 | 1/2019 |
| KR | 100574959 B1 | 4/2006 |
| KR | 20110050351 | 5/2011 |
| KR | 20150095841 A | 8/2015 |
| KR | 20160008267 A | 1/2016 |
| WO | 2017058488 | 4/2017 |

(56) References Cited

FOREIGN PATENT DOCUMENTS

| WO | 2017069706 | 4/2017 |
|---|---|---|
| WO | 2017169882 | 10/2017 |

OTHER PUBLICATIONS

U.S. Appl. No. 16/436,049, Non-Final Office Action dated Mar. 4, 2020, 9 pages.

Cho et al., Low Power Dual CDS for a Column-Parallel CMOS Image Sensor, JSTS: Journal of Semiconductor Technology and Science, vol. 12, No. 4, Dec. 30, 2012, pp. 388-396.

Kavusi et al., Quantitative Study of High-Dynamic-Range Image Sensor Architectures, Proceedings of SPIE, The International Society for Optical Engineering, vol. 5301, Jun. 7, 2004, pp. 264-275.

International Application No. PCT/US2019/035724, International Search Report and Written Opinion dated Sep. 10, 2019, 12 pages.

International Application No. PCT/US2019/036484, International Search Report and Written Opinion dated Sep. 19, 2019, 10 pages.

International Application No. PCT/US2019/036492, International Search Report and Written Opinion dated Sep. 25, 2019, 9 pages.

International Application No. PCT/US2019/036536, International Search Report and Written Opinion dated Sep. 26, 2019, 14 pages.

International Application No. PCT/US2019/039410, International Search Report and Written Opinion dated Sep. 30, 2019, 11 pages.

International Application No. PCT/US2019/039758, International Search Report and Written Opinion dated Oct. 11, 2019, 13 pages.

Snoeij, A Low Power Column-Parallel 12-Bit ADC for CMOS Imagers, Proceedings IEEE Workshop on Charge-Coupled Devices Andadvanced Image Sensors (CCDS & AIS), IEEE, Jun. 1, 2005, pp. 169-172.

Xu, et al., "A New Digital-Pixel Architecture for CMOS Image Sensor With Pixel-Level ADC and Pulse Width odulation using A 0.18 Mu M CMOS Technology", IEEE Conference on Electron Devices and Solid-State Circuits, Dec. 16-18, 2003, pp. 265-268.

U.S. Appl. No. 15/719,345, "Final Office Action", dated Apr. 29, 2020, 14 pages.

U.S. Appl. No. 15/719,345, "Non-Final Office Action", dated Nov. 25, 2019, 14 pages.

U.S. Appl. No. 15/719,345, "Notice of Allowance", dated Aug. 12, 2020, 11 pages.

U.S. Appl. No. 15/801,216, "Advisory Action", dated Apr. 7, 2020, 3 pages.

U.S. Appl. No. 15/801,216, "Final Office Action", dated Dec. 26, 2019, 5 pages.

U.S. Appl. No. 15/801,216, "Non-Final Office Action", dated Jun. 27, 2019, 13 pages.

U.S. Appl. No. 15/801,216, "Notice of Allowance", dated Jun. 23, 2020, 5 pages.

U.S. Appl. No. 15/847,517, "Non-Final Office Action", dated Nov. 23, 2018, 21 pages.

U.S. Appl. No. 15/847,517, "Notice of Allowance", dated May 1, 2019, 11 pages.

U.S. Appl. No. 15/861,588, "Non-Final Office Action", dated Jul. 10, 2019, 11 pages.

U.S. Appl. No. 15/861,588, "Notice of Allowance", dated Nov. 26, 2019, 9 pages.

U.S. Appl. No. 15/876,061, "Corrected Notice of Allowability", dated Apr. 28, 2020, 3 pages.

U.S. Appl. No. 15/876,061, "Non-Final Office Action", dated Sep. 18, 2019, 23 pages.

U.S. Appl. No. 15/876,061, "Notice of Allowability", dated May 6, 2020, 2 pages.

U.S. Appl. No. 15/876,061, "Notice of Allowance", dated Feb. 4, 2020, 13 pages.

U.S. Appl. No. 15/983,379, "Notice of Allowance", dated Oct. 18, 2019, 9 pages.

U.S. Appl. No. 16/177,971, "Final Office Action", dated Feb. 27, 2020, 9 pages.

U.S. Appl. No. 16/177,971, "Non-Final Office Action", dated Sep. 25, 2019, 9 pages.

U.S. Appl. No. 16/177,971, "Notice of Allowance", dated Apr. 24, 2020, 6 pages.

U.S. Appl. No. 16/249,420, "Non-Final Office Action", dated Jul. 22, 2020, 9 pages.

U.S. Appl. No. 16/286,355, "Non-Final Office Action", dated Oct. 1, 2019, 6 pages.

U.S. Appl. No. 16/286,355, "Notice of Allowance", dated Feb. 12, 2020, 7 pages.

U.S. Appl. No. 16/286,355, "Notice of Allowance", dated Jun. 4, 2020, 7 pages.

U.S. Appl. No. 16/369,763, "Non-Final Office Action", dated Jul. 22, 2020, 15 pages.

U.S. Appl. No. 16/382,015, "Notice of Allowance", dated Jun. 11, 2020, 11 pages.

U.S. Appl. No. 16/431,693, "Notice of Allowance", dated Jun. 24, 2020, 7 pages.

U.S. Appl. No. 16/435,449, "Notice of Allowance", dated Jul. 27, 2020, 8 pages.

U.S. Appl. No. 16/436,049, "Non-Final Office Action", dated Jun. 30, 2020, 11 pages.

U.S. Appl. No. 16/566,583, "Final Office Action", dated Apr. 15, 2020, 24 pages.

U.S. Appl. No. 16/566,583, "Non-Final Office Action", dated Jul. 27, 2020, 11 pages.

U.S. Appl. No. 16/566,583, "Non-Final Office Action", dated Oct. 1, 2019, 10 pages.

EP18179838.0, "Partial European Search Report", dated Dec. 5, 2018, 14 pages.

EP18179846.3, "Extended European Search Report", dated Dec. 7, 2018, 10 pages.

EP18179851.3, "Extended European Search Report", dated Dec. 7, 2018, 8 pages.

EP18188962.7, "Extended European Search Report", dated Oct. 23, 2018, 8 pages.

EP18188962.7, "Office Action", dated Aug. 28, 2019, 6 pages.

EP18188968.4, "Extended European Search Report", dated Oct. 23, 2018, 8 pages.

EP18188968.4, "Office Action", dated Aug. 14, 2019, 5 pages.

EP18189100.3, "Extended European Search Report", dated Oct. 9, 2018, 8 pages.

PCT/US2018/039350, "International Search Report and Written Opinion", dated Nov. 15, 2018, 13 pages.

PCT/US2018/039352, "International Search Report and Written Opinion", dated Oct. 26, 2018, 10 pages.

PCT/US2018/039431, "International Search Report and Written Opinion", dated Nov. 7, 2018, 14 pages.

PCT/US2018/045661, "International Search Report and Written Opinion", dated Nov. 30, 2018, 11 Pages.

PCT/US2018/045673, "International Search Report and Written Opinion", dated Dec. 4, 2018, 13 pages.

PCT/US2018/046131, "International Search Report and Written Opinion", dated Dec. 3, 2018, 10 pages.

PCT/US2019/019756, "International Search Report and Written Opinion", dated Jun. 13, 2019, 11 pages.

PCT/US2019/036575, "International Search Report and Written Opinion", dated Sep. 30, 2019, 16 pages.

PCT/US2019/048241, "International Search Report and Written Opinion", dated Jan. 28, 2020, 16 pages.

PCT/US2019/065430, "International Search Report and Written Opinion", dated Mar. 6, 2020, 15 pages.

Tanners, et al., "A Low Power Dual CDS for a Column-Parallel CMOS Image Sensor", Journal of Semiconductor Technology and Science, vol. 12, No. 4, Dec. 30, 2012, 9 pages.

U.S. Appl. No. 15/719,345, "Notice of Allowance", dated Sep. 3, 2020, 12 pages.

U.S. Appl. No. 16/435,449, "Notice of Allowance", dated Sep. 16, 2020, 7 pages.

* cited by examiner

GLOBAL SHUTTER IMAGE SENSOR

RELATED APPLICATION

This patent application claims priority to U.S. Provisional Patent Application Ser. No. 62/691,223, filed Jun. 28, 2018, entitled "DIGITAL PIXEL SENSOR WITH ENHANCED SHUTTER EFFICIENCY," and which is incorporated by reference in its entirety for all purposes.

BACKGROUND

The disclosure relates generally to image sensors, and more specifically to pixel cell structure including interfacing circuitries for determining light intensity for image generation.

A typical image sensor includes a photodiode to measure the intensity of incident light by converting photons into charge (e.g., electrons or holes), and a charge storage device to store the charge. To reduce image distortion, a global shutter operation can be performed in which each photodiode of the array of photodiodes senses the incident light simultaneously in a global exposure period to generate charge. The charge generated by the array of photodiodes can then be quantized by an analog-to-digital converter (ADC) into digital values to generate the image. One important performance metrics of an image sensor is global shutter efficiency (GSE), which measures how much of the charge stored in the charge storage device is contributed by parasitic light received outside the global exposure period.

SUMMARY

The present disclosure relates to image sensors. More specifically, and without limitation, this disclosure relates to a pixel cell. This disclosure also relates to operating the circuitries of pixel cells to generate a digital representation of the intensity of incident light.

In one example, an apparatus is provided. The apparatus comprises: a photodiode, charge sensing unit including a first charge storage device and a second charge storage device, an analog-to-digital converter (ADC), and a controller. The controller is configured to: within an exposure period: enable the photodiode to, in response to incident light, accumulate residual charge and transfer overflow charge to the first charge storage device and the second charge storage device when the photodiode saturates. The controller is also configured to, after the exposure period ends: disconnect the second charge storage from the first charge device, transfer the residual charge to the first charge storage device to cause the charge sensing unit to generate a first voltage, control the ADC to quantize the first voltage to generate a first digital value to measure the residual charge, connect the first charge storage with the second charge storage to cause the charge sensing unit to generate a second voltage, quantize the second voltage to generate a second digital value to measure the overflow charge, and generate a digital representation of an intensity of the incident light based on the first digital value, the second digital value, and based on whether the photodiode saturates.

In some aspects, the apparatus further comprises: a first switch coupled between the photodiode and the first charge storage device, the first switch controllable by the controller to transfer the residual charge or the overflow charge from the photodiode; and a second switch controllable by the controller to connect the first charge storage device and the second charge storage device in parallel, or to disconnect the second charge storage device from the first charge storage device.

In some aspects, the controller is configured to, during the exposure period: control the second switch to connect the first charge storage device and the second charge storage device in parallel; and control the first switch to enable the photodiode to transfer the overflow charge to the first charge storage device and the second charge storage device connected in parallel if the photodiode saturates.

In some aspects, the controller is configured to: control the second switch to disconnect the second charge storage device from the first charge storage device and from the photodiode to enable the first charge storage device to store a first portion of the overflow charge and the second charge storage device to store a second portion of the overflow charge; and control the first switch to transfer the residual charge to the first charge storage device to cause the charge sensing unit to generate the first voltage.

In some aspects, the first voltage is based on a quantity of the residual charge and a quantity of the first portion of the overflow charge and a capacitance of the first charge storage device.

In some aspects, the second voltage is based on the quantity of the residual charge, the quantity of the overflow charge, and a total capacitance of the first charge storage device and the second charge storage device.

In some aspects, the controller is configured to empty the first charge storage device prior to transferring the residual charge of the each pixel cell to the first charge storage device. The first voltage is based on a quantity of the residual charge and a capacitance of the first charge storage device.

In some aspects, the second voltage is based on the quantity of the residual charge, a quantity of the second portion of the overflow charge, and a total capacitance of the first charge storage device and the second charge storage device.

In some aspects, the controller is configured to: generate a first digital representation of the residual charge and a second digital representation of the overflow charge based on the first digital value, the second digital value, and capacitances of the first charge storage device and of the second charge storage device; and based on whether the photodiode saturates, generate the digital representation of the intensity of the incident light based on the first digital representation of the residual charge or the second digital representation of the overflow charge.

In some aspects, the apparatus further comprises a memory and a counter. The ADC further comprises a comparator configured to: compare the first voltage against a first ramping voltage to output a first decision, obtain the first digital value from the counter based on the first decision, compare the second voltage against a second ramping voltage to output a second decision, obtain the second digital value from the counter based on the second decision, and store both the first digital value and the second digital value in the memory.

In some aspects, the controller is configured to reset the comparator and the first and second charge storage devices simultaneously prior to comparing the first voltage against the first ramping voltage.

In some aspects, the controller is configured to reset the comparator, and then reset the first and second charge storage devices when the comparator is out of reset, prior to comparing the second voltage against the second ramping voltage.

In some aspects, the first ramping voltage and the second ramping voltage have opposite ramping directions.

In some aspects, a polarity of comparison of the comparator is inverted in the generation of the second digital value with respect to the generation of the first digital value.

In some aspects, the apparatus further comprises an input multiplexor controllable to swap inputs to a first input terminal and a second input terminal of the comparator between the generation of the first digital value and the generation of the second digital value to invert the polarity of the comparison.

In some aspects, the apparatus further comprises an output multiplexor controllable to invert an output of the comparator between the generation of the first digital value and the generation of the second digital value to invert the polarity of the comparison.

In one example, a method is provided. The method comprises: within an exposure period, enabling a photodiode to, in response to incident light, accumulate residual charge, and to transfer overflow charge to a first charge storage device and a second charge storage device when the photodiode saturates; disconnecting the second charge storage device from the first charge storage device; enabling the photodiode to transfer the residual charge to the first charge storage device to cause the charge sensing unit to output a first voltage; quantizing the first voltage to generate a first digital value to measure the residual charge; connecting the second charge storage device with the first charge storage device to cause the charge sensing unit to output a second voltage; quantizing the second voltage to generate a second digital value to measure the overflow charge; and generating a digital representation of the incident light intensity based on the first digital value and the second digital value.

In some aspects, the method further comprises: connecting the first charge storage device and the second charge storage device in parallel to receive the overflow charge from the photodiode; and disconnecting the first charge storage device from the second charge storage device such that the first charge storage device stores a first portion of the overflow charge and the second charge storage device stores a second portion of the overflow charge.

In some aspects, the residual charge combines with the first portion of the overflow charge to generate the first voltage.

In some aspects, the method further comprises emptying the first charge storage device prior to transferring the residual charge of to the first charge storage device. The residual charge is stored at the emptied first charge storage device to generate the first voltage.

BRIEF DESCRIPTION OF THE DRAWINGS

Illustrative examples are described with reference to the following figures.

Figure 1A:
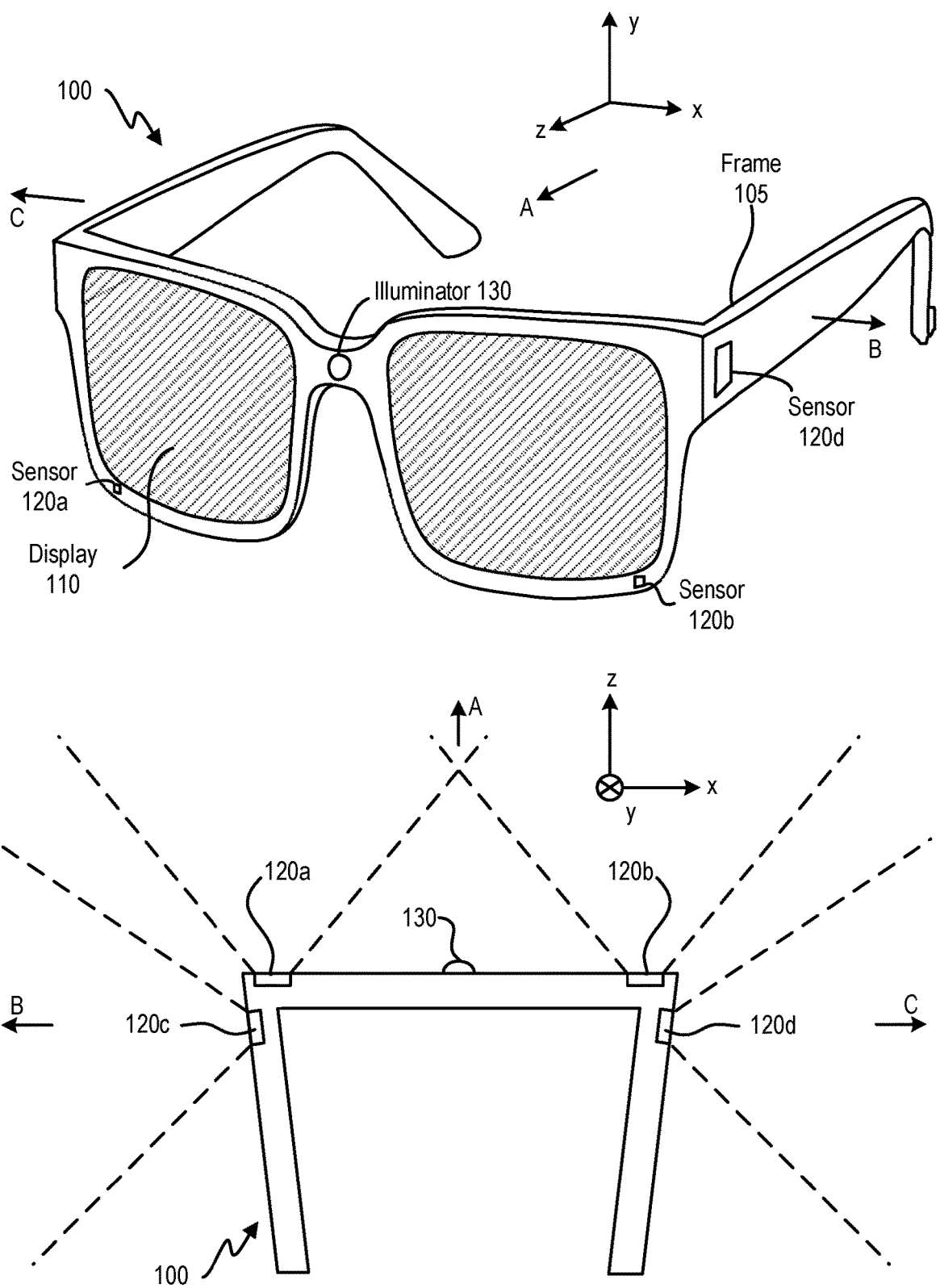
FIGS. 1A and 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes an array of pixel cells. Each pixel cell includes a photodiode to measure the intensity incident light by converting photons into charge (e.g., electrons or holes). The charge generated by the photodiode can be temporarily stored in a charge storage device, such as a floating drain node, within the pixel cell. The charge stored at the each pixel cell can be quantized by an analog-to-digital converter (ADC) into digital values. The ADC can quantize the charge by, for example, using a comparator to compare a voltage representing the charge with one or more quantization levels, and a digital value can be generated based on the comparison result. The digital values from the pixel cells can then be stored in a memory to generate an image.

Due to power and chip area limitation, typically the ADC and the memory are shared by at least some of the pixel cells, instead of providing a dedicated ADC and a memory to each pixel cell. A rolling shutter operation can be performed to accommodate the sharing of the ADC and the memory among the pixel cells. For example, the array of pixel cells can be divided into multiple groups (e.g., rows or columns of pixel cells), with the pixels of each group sharing an ADC and the memory. To accommodate the sharing of the ADC and the memory, a rolling shutter operation can be performed in which each pixel cell within the group can take a turn to be exposed to incident light to generate the charge, followed by accessing the ADC to perform the quantization of the charge into a digital value, and storing the digital value into the memory. As the rolling shutter operation exposes different pixel cells to incident light at different times, an image generated from the rolling shutter operation can experience distortion, especially for images of a moving object and/or images captured when the image sensor is moving. The potential distortion introduced by rolling shutter operation makes it unsuitable for augmented reality/mixed reality/virtual reality (AR/MR/VR) applications, wearable applications, etc., in which the image sensor can be part of a headset and can be in motion when capturing images.

To reduce image distortion, a global shutter operation can be performed in which each pixel cell of the array of pixel cells is exposed to incident light to generate charge simultaneously within a global shutter period (or a global integration period). Each pixel cell can also include a charge storage device to temporarily store charge generated by the photodiode within the global exposure period. The charge stored in the charge storage device can be quantized to generate a digital value for the each pixel cell. The digital values of the pixel cells can represent a distribution of intensities of the incident light received by the pixel cells within the global shutter period.

One important performance metrics for a global shutter operation is global shutter efficiency (GSE), which measures how much of the charge stored in the charge storage device and quantized by the ADC is contributed by parasitic light which is not the object of the intensity measurement. One source of parasitic light can be due to non-uniform exposure periods caused by, for example, non-uniform exposure start times and/or end times. For example, in a multi-stage readout and quantization scheme, a first stage readout and quantization operation may be performed when the photodiode is still transferring charge to the charge storage device, followed by a second stage readout and quantization operation after the charge transfer stops. As a result, the exposure periods for the two stages of readout and quantization operations may have different end times. The non-uniform exposure periods can lead to different pixel cells generating pixel data based on light detected within different time periods rather than within the same global exposure period. This can introduce motion blur when imaging a bright, fast moving object similar to a rolling shutter operation.

This disclosure relates to an image sensor that can provide an improved global shutter operation by addressing some of the issues discussed above. The image sensor includes a pixel cell array to measure the intensity of incident light within a global exposure period. Each pixel cell includes a photodiode and a charge sensing unit comprising a buffer, a first charge storage device, and a second charge storage device. The first charge storage device can be a floating drain, whereas the second charge device can be a capacitor (e.g., a metal oxide silicon (MOS) capacitor, a metal capacitor, etc.). The first charge storage device and the second charge storage device can be connected in parallel to receive charge from the photodiode, or can be disconnected such that only the first charge storage device receives charge from the photodiode. The charge sensing unit can output a voltage based on the charge accumulated at the first charge one or more charge storage devices. The image sensor further includes one or more ADCs and a controller. The controller can enable the photodiode of each pixel cell to, within the global exposure period, generate charge in response to incident light. The photodiode can accumulate at least part of the charge as residual charge and transfer the remaining charge as overflow charge to the charge sensing unit after the photodiode saturates. The overflow charge can be accumulated by the parallel combination of the first charge storage device and the second charge storage device. After the global exposure period ends, the controller can disconnect the photodiode from the charge sensing unit to stop the transfer of charge to the charge sensing unit, control the one or more ADCs to perform a first quantization operation and a second quantization operation on the output voltage of the charge sensing unit to generate, respectively, a first digital value and a second digital value, and output one of the first digital value or the second digital value for each pixel cell based on whether the photodiode of the each pixel cell saturates.

Specifically, after the global exposure period ends, the controller can first cause the photodiode of the each pixel cell to transfer the residual charge to the first charge storage device, which causes the charge sensing unit to output a first voltage. In some examples, the first voltage can represent a quantity of the residual charge as well as a part of the overflow charge. In some examples, the first charge storage device can be reset prior to the transfer of the residual charge, and the first voltage can represent a quantity of the residual charge. The global exposure period ends after the transfer of the residual charge to the first storage device at the each pixel ends. After the transfer of the residual charge (as well as the global exposure period) ends, the controller can control the one or more ADCs to perform a first quantization operation of the first voltage to measure the residual charge generated at the each pixel cell during the global exposure period.

After the first quantization operation, the controller can then connect the first charge storage device with the second charge storage device, which causes the charge sensing unit to output a second voltage. The second voltage can represent the quantities of the residual charge and a part of the overflow charge (if the first charge storage device is reset prior to the transfer of the residual charge) or the entirety of the overflow charge. The controller can control the one or more ADCs to perform a second quantization operation of the second voltage to measure the overflow charge generated at the each pixel cell during the global exposure period.

In some examples, the one or more ADCs may include a comparator at the each pixel cell, together with a counter and a memory. The memory can update a count value periodically. In both the first quantization and second quantization operations, the comparator can compare the first voltage and second voltage against a ramping threshold voltage to generate decisions. The decisions can indicate that a matching threshold voltage that matches the first voltage (or the second voltage) is found. The decisions can control the time when the memory stores a count value of the counter which corresponds to the matching threshold voltage in each quantization operation as the first digital value (for the first quantization operation) or as the second digital value (for the second quantization operation). The decision generated from comparing the first voltage against the ramping threshold voltage can also indicate whether the photodiode saturates, based on which the controller can decide whether to store the second digital value from the second quantization operation (of overflow charge) into the memory to represent the intensity of light. Various noise and offset compensation techniques, such as correlated double sampling, can be employed to mitigate the effect of reset noise and comparator offset on the quantization operations. In some examples, a first ramping threshold voltage can be used for the first quantization operation which can have an opposite ramping direction from a second ramping threshold voltage used for the second quantization operation.

With examples of the present disclosure, light intensity measurement at each pixel cell can be based on charge generated a photodiode of the pixel cell within a global exposure period. Moreover, as the photodiode stops transferring charge to the charge storage devices after the global exposure period ends, each of the subsequent read out and quantization operations can be based on charge generated within the same global exposure period. As a result, the image sensor not only can support a global shutter operation but also can provide improved global shutter efficiency. Further, various techniques employed in the multi-stage readout and quantization operations can further extend the dynamic range of the image sensor. All these can improve the performances of the image sensor as well as the applications that rely on the image sensor outputs.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
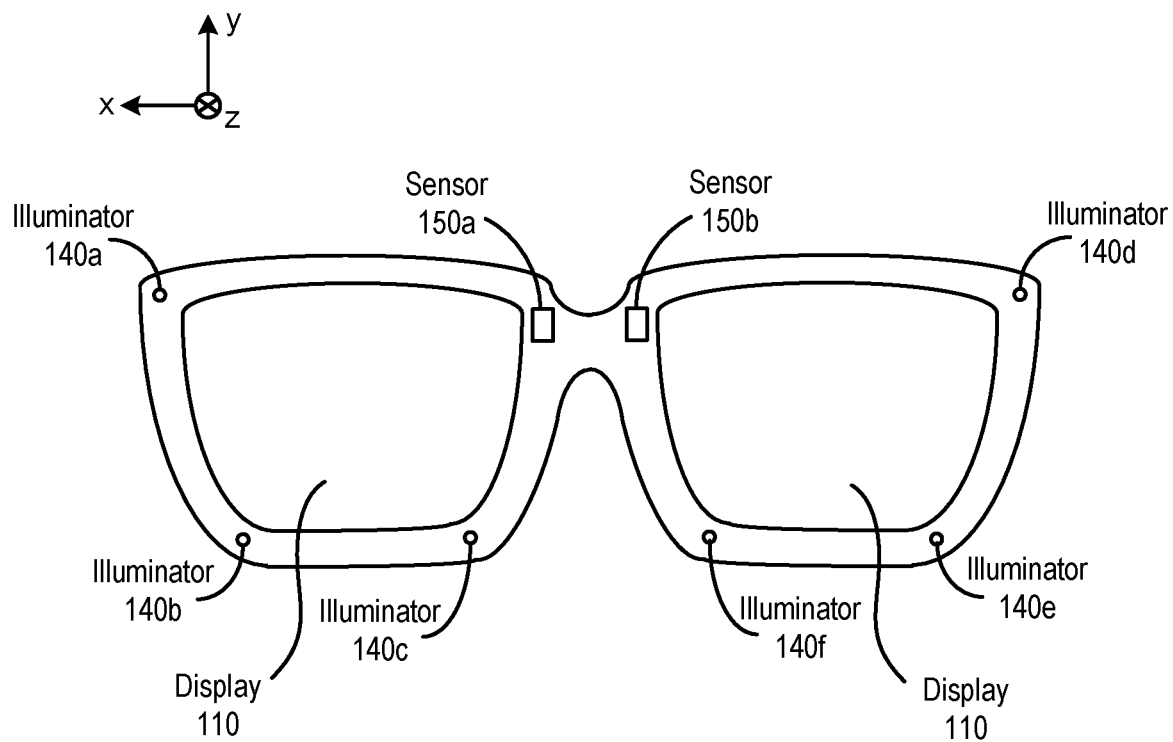

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
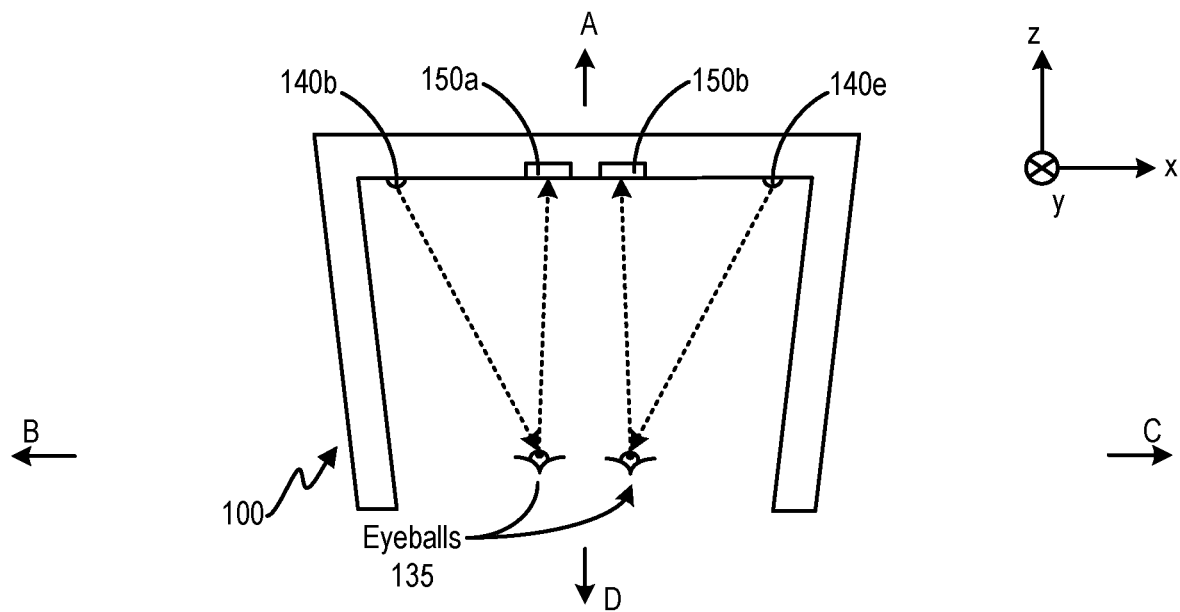
Figure 2:
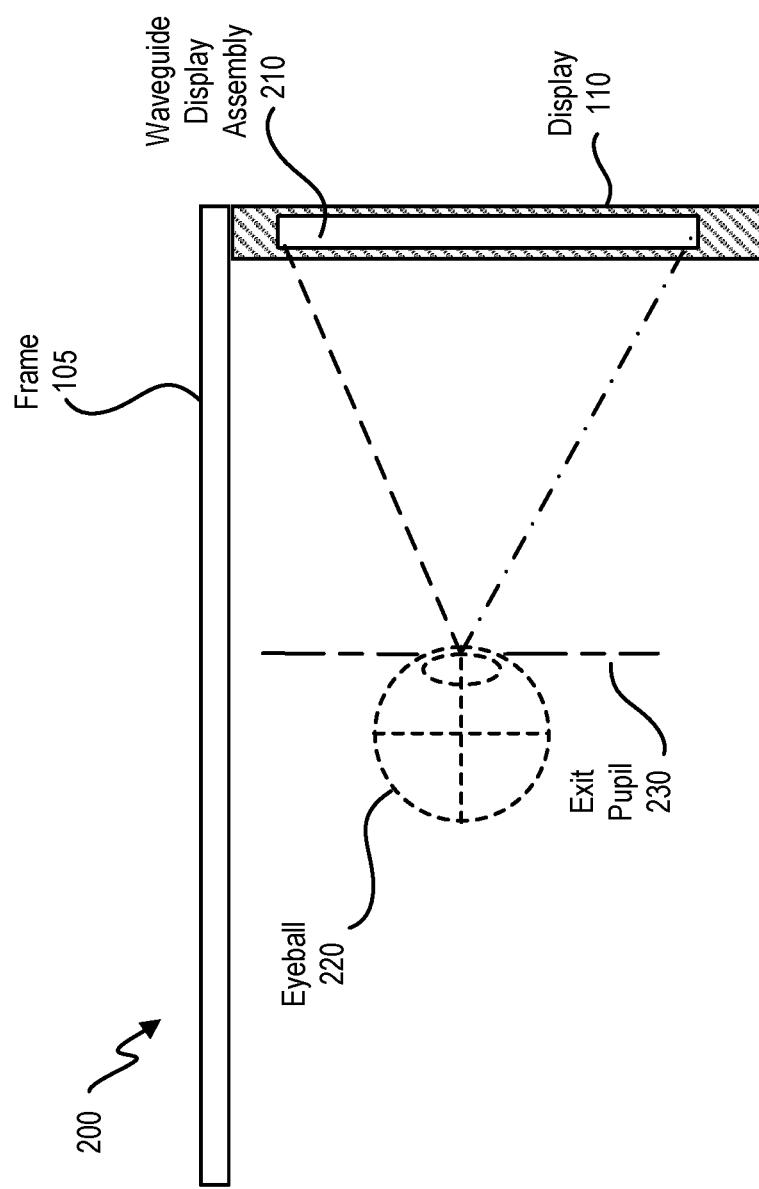
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
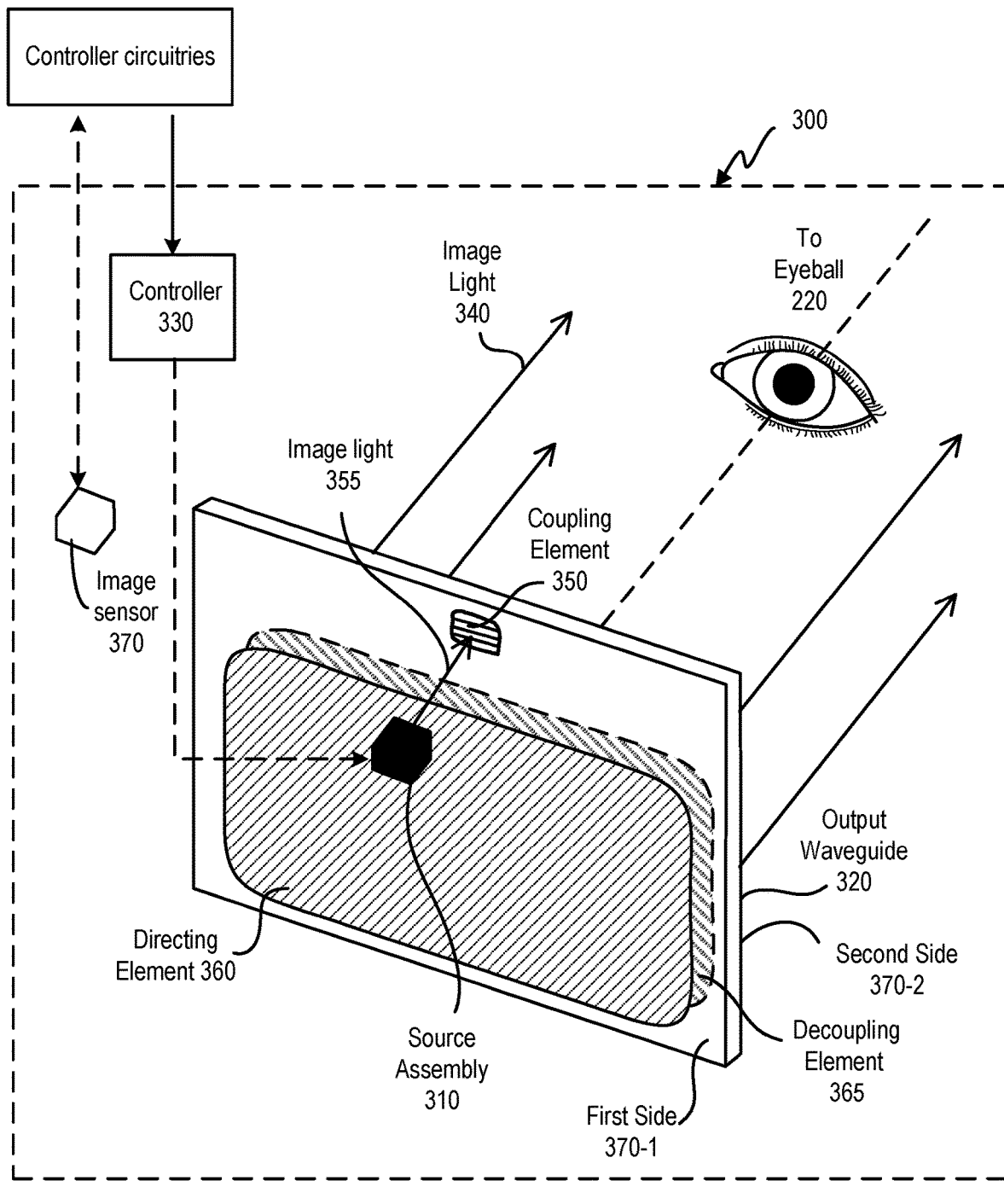
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
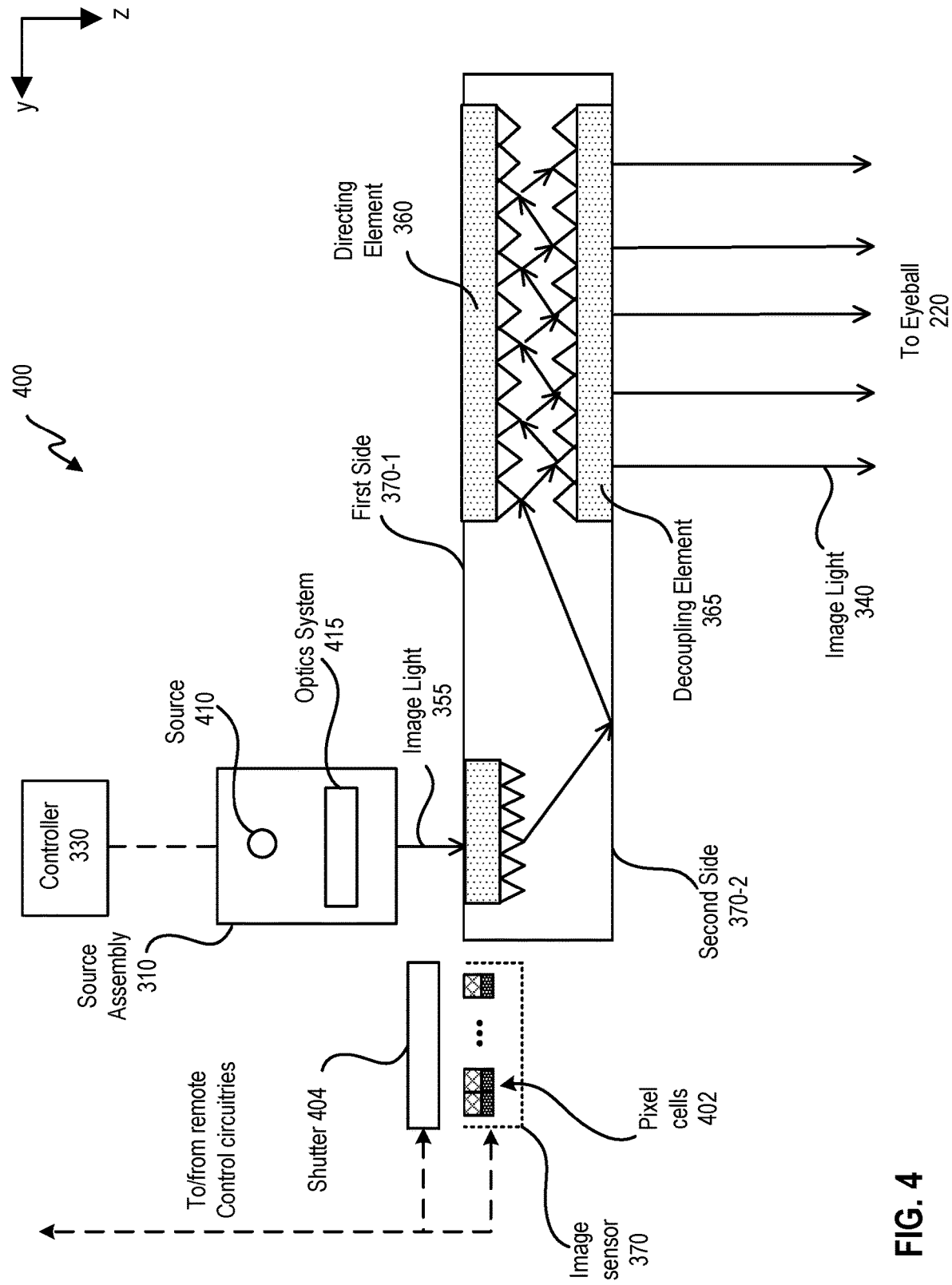
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
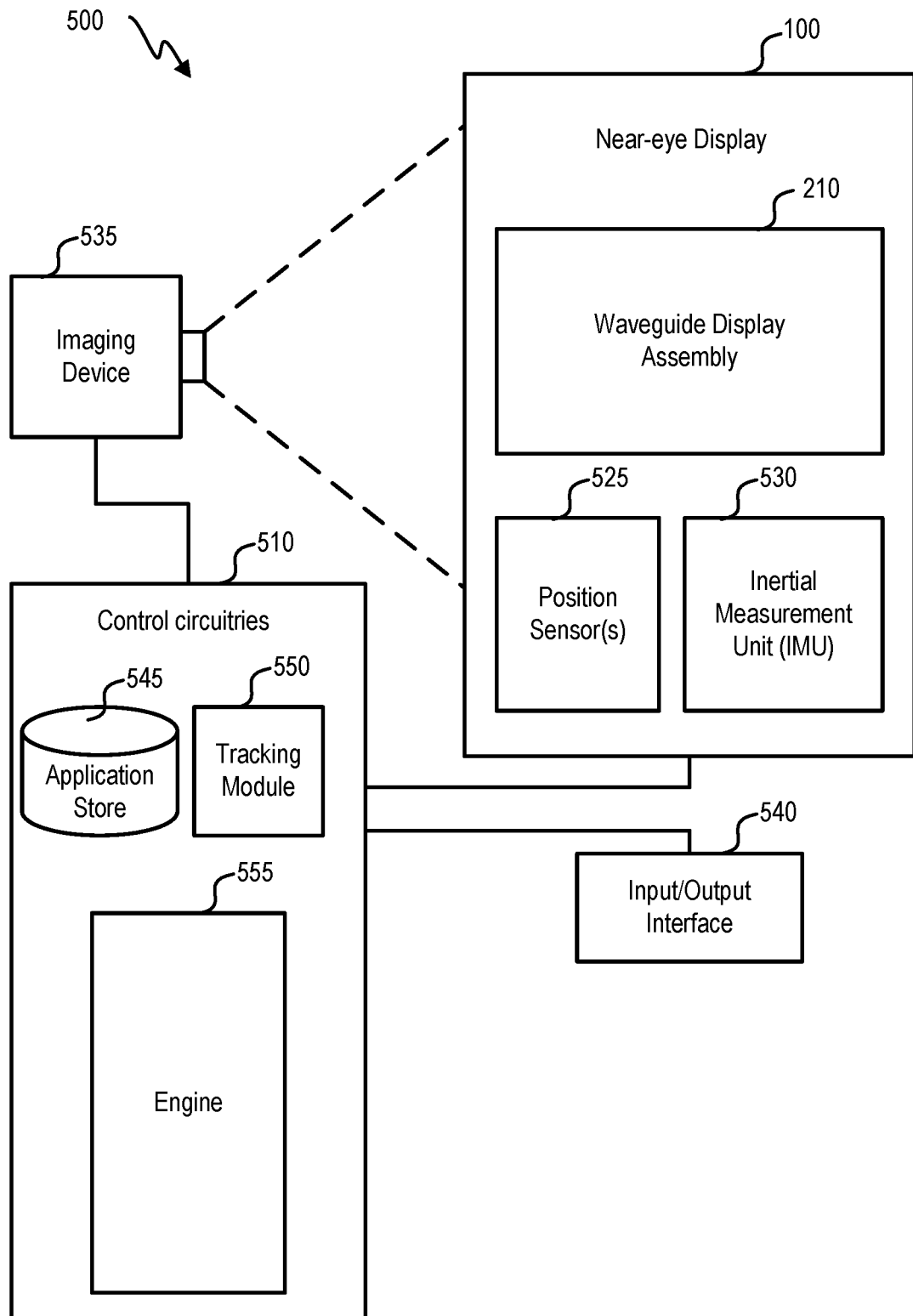
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
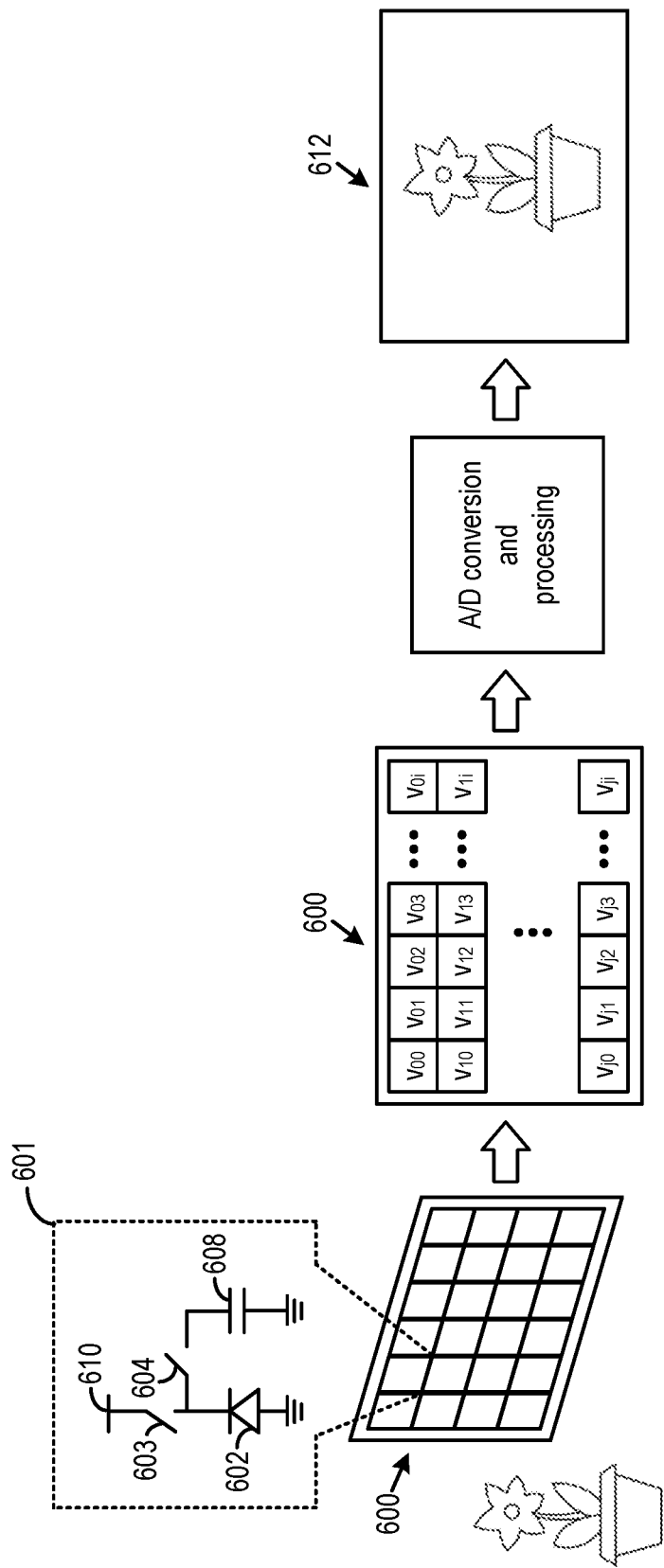
FIG. 6 illustrates block diagrams of examples of a pixel cell.

FIG. 6 illustrates examples of an image sensor and its operations. As shown in FIG. 6, image sensor 600 can include an array of pixel cells, including pixel cell 601, and can generate digital intensity data corresponding to pixels of an image. Pixel cell 601 may be part of pixel cells 402 of FIG. 4. As shown in FIG. 6, pixel cell 601 may include a photodiode 602, an electronic shutter switch 603, a transfer switch 604, a charge sensing unit 608 comprising a charge storage device 608a and a buffer 608b, and a charge sink 610. Photodiode 602 may include, for example, a P-N diode, a P-I-N diode, a pinned diode, etc. Photodiode 602 can generate charge upon receiving light within an exposure period, and the quantity of charge generated within the exposure period can be proportional to the intensity of the light. Photodiode 602 can also store the generated charge.

Before a global exposure period starts, electronic shutter switch 603 of each pixel cell can be enabled to steer any charge generated by photodiode 602 to charge sink 610. To start the global exposure period, electronic shutter switch 603 can be disabled. Photodiode 602 of each pixel cell can generate and accumulate charge. Towards the end of the exposure period, transfer switch 604 of each pixel cell can be enabled to transfer the charge stored in photodiode 602 to charge storage device 608a to develop a voltage. The global exposure period ends when transfer switch 604 is disabled to stop the transfer, while electronic shutter switch 603 can also be enabled to remove new charge generated by photodiode 602. To support a global shutter operation, the global exposure period can start and end at the same time for each pixel cells. An array of voltages, including $v_{00}$, $v_{01}$, . . . $v_{ji}$, can be obtained at the end of the global exposure period. The array of voltages can be quantized by an A/D converter (which can be external or internal to the pixel cells) into digital values. The digital values can be further processed to generate an image 612. Another global exposure period can start when electronic shutter switch 603 is disabled again to generate a new image.

Figure 7:
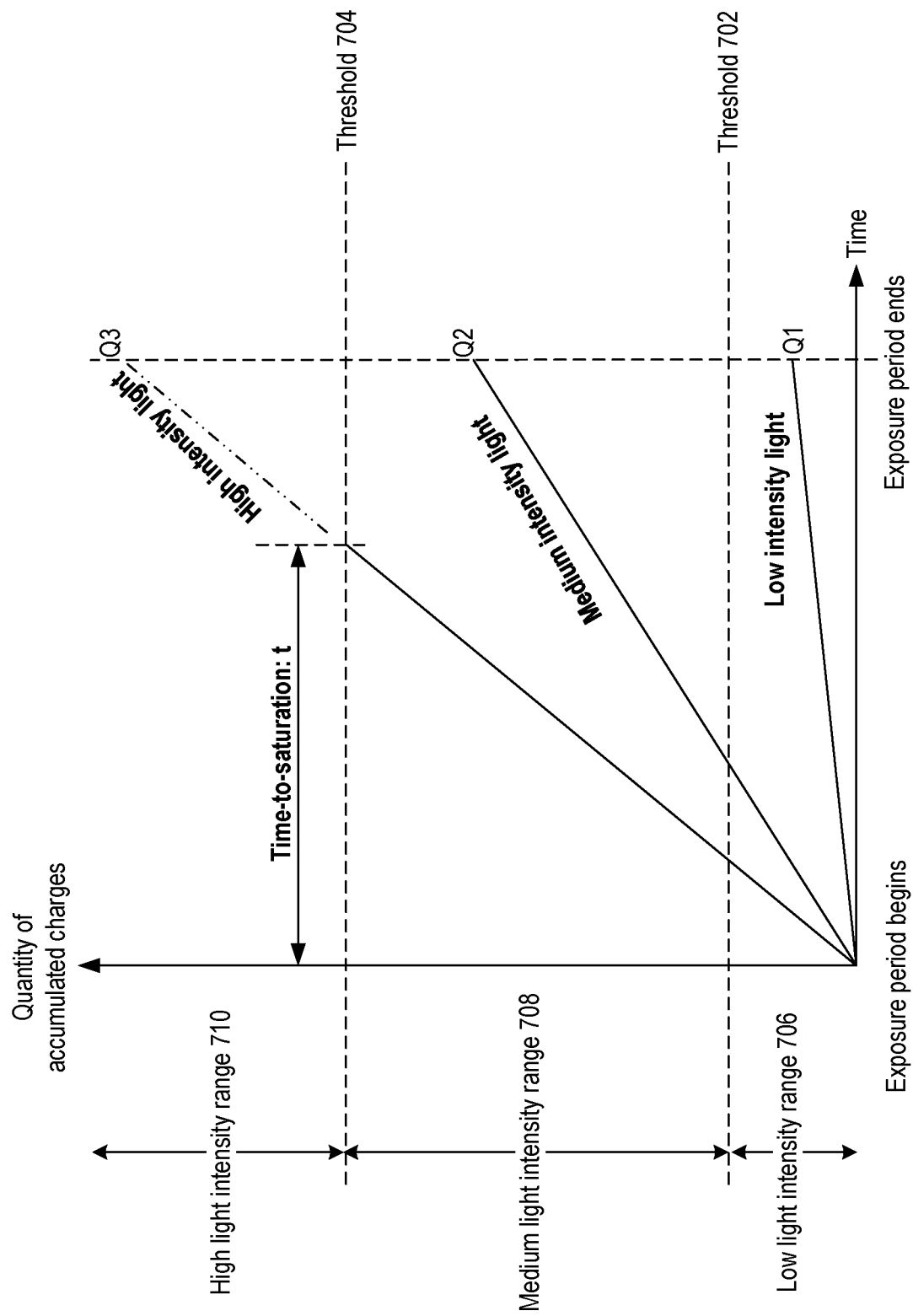
FIG. 7 illustrates operations for determining light intensities of different ranges by examples of FIG. 6.

Reference is now made to FIG. 7, which illustrates a quantity of charge accumulated with respect to time for different light intensity ranges. The total quantity of charge accumulated at a particular time point can reflect the intensity of light incident upon photodiode 602 during an exposure period. The quantity can be measured when the exposure period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within medium light intensity range 710. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and charge storage device 608a. For example, low light intensity range 706 can be defined such that the total quantity of charge stored in photodiode 602, at the end of the exposure period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in charge storage device 608a, at the end of the exposure period, is below or equal to the storage capacity of the measurement capacitor, and threshold 704 can be based on the storage capacity of charge storage device 608a. Typically threshold 704 is also set to be based on a scaled storage capacity of charge storage device 608a to ensure that when the quantity of charge stored in charge storage device 608a is measured for intensity determination, the measurement capacitor does not saturate, and the measured quantity also relates to the incident light intensity. As to be described below, thresholds 702 and 704 can be used to detect whether photodiode 602 and charge storage device 608a saturate, which can determine the intensity range of the incident light and the measurement result to be output.

In addition, in a case where the incident light intensity is within high light intensity range 710, the total overflow charge accumulated at charge storage device 608a may exceed threshold 704 before the exposure period ends. As additional charge is accumulated, charge storage device 608a may reach full capacity before the end of the exposure period, and charge leakage may occur. To avoid measurement error caused due to charge storage device 608a reaching full capacity, a time-to-saturation measurement can be performed to measure the time duration it takes for the total overflow charge accumulated at charge storage device 608a to reach threshold 704. A rate of charge accumulation at charge storage device 608a can be determined based on a ratio between threshold 704 and the time-to-saturation, and a hypothetical quantity of charge (Q3) that could have been accumulated at charge storage device 608a at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 710.

Figure 8:
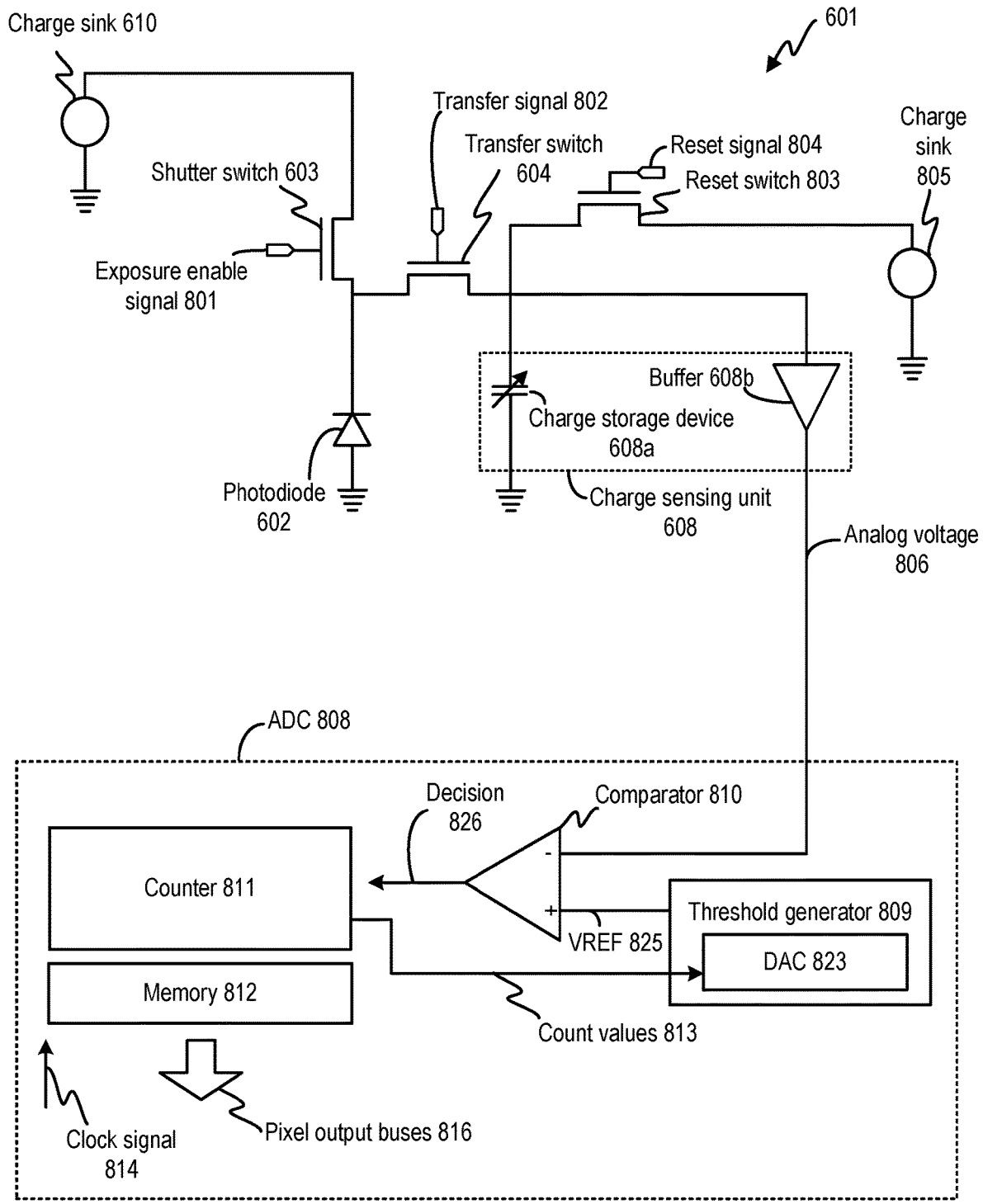
FIG. 8 illustrates examples of internal components of the pixel cell of FIG. 6.

Reference is now made to FIG. 8, which describes additional components of pixel cell 601 and their operations to support measurement of light across light intensity ranges 706, 708, and 710. As shown in FIG. 8, each of electronic shutter switch 603 and transfer switch 604 can include a metal-oxide-semiconductor field-effect transistor (MOS-FET), a bipolar junction transistor (BJT), etc. Electronic shutter switch 603 can be controlled by an exposure enable signal 801, whereas transfer switch 604 can be controlled by a transfer signal 802. Moreover, charge storage device 608a can have a variable capacitance. For example, as to be described below, charge storage device 608a can include a floating drain node configured as a first capacitor, as well as a second capacitor implemented based on, for example, a MOS capacitor, a metal capacitor, a diode junction capacitor, etc. Charge storage device 608a may include a switch coupled across the first capacitor and the second capacitor. The switch can be enabled to connect the two capacitors in parallel to increase the capacitance of charge storage device 608a. The switch can also be disabled so that only the first capacitor can receive charge from the photodiode, to reduce the capacitance of charge storage device. Further, pixel cell 601 can include a reset switch 803 controlled by a reset signal 804. Reset switch 803 can also be transistor and can be connected to charge sink 805. Reset switch 803 can be controlled to reset charge storage device 608a.

To measure high light intensity range 710 and medium light intensity range 708, transfer switch 604 can be biased by transfer signal 802 in a partially turned-on state. For example, the gate voltage of transfer switch 604 can be set based on a voltage developed at photodiode 602 corresponding to the charge storage capacity of the photodiode. With such arrangements, only overflow charge (e.g., charge generated by the photodiode after the photodiode saturates) will transfer through transfer switch 604 to reach charge storage device 608a, to measure time-to-saturation (for high light intensity range 710) and the quantity of charge stored in charge storage device 608a (for medium light intensity range 708). For measurement of medium and high light intensity ranges, the capacitance of charge storage device 608a can also be maximized to increase threshold 704.

Moreover, to measure low light intensity range 706, transfer switch 604 can be controlled in a fully turned-on state to transfer the charge stored in photodiode 602 to charge storage device 608a. Moreover, the capacitance of charge storage device 608a can be reduced. The reduction in the capacitance of charge storage device 608a can increase the charge-to-voltage conversion ratio at charge storage device 608a, such that a higher voltage can be developed for a certain quantity of stored charge. The higher charge-to-voltage conversion ratio can reduce the effect of measurement errors (e.g., quantization error, comparator offset, etc.) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 601 and extends the dynamic range.

The charge (residual charge and/or overflow charge) accumulated at charge storage device 608a can develop an analog voltage 806, which can be quantized by an analog-to-digital converter (ADC) 808 to generate a digital value to represent the intensity of incident light during the exposure period. As shown in FIG. 8, ADC 808 can include a threshold generator 809, a comparator 810, a counter 811, and a memory 812. Counter 811 can generate a set of count values 813 based on a free-running clock signal 814, whereas memory 812 can store a count value (e.g., the latest count value) generated by counter 811. Memory 812 can be, for example, a latch circuit to store the counter value based on local pixel value as described below. The stored count value can be output via pixel output buses 816. Threshold generator 809 includes a digital-to-analog converter (DAC) 823 which can accept a set of digital values and output a reference voltage (VREF) 825 representing the set of digital values. As to be discussed in more detail below, threshold generator 809 may accept static digital values to generate a fixed threshold, or accept count values 813 of counter 811 to generate a ramping threshold. Although FIG. 8 illustrates that ADC 806 as separate from pixel cell 601, it is understood that some or all of ADC 808 can be part of pixel cell 601. For example, comparator 810 can be part of pixel cell 601, whereas threshold generator 809 (and DAC 823), counter 811, and memory 812 can be shared among pixel cells.

Comparator 810 can compare analog voltage 806 against the threshold provided by threshold generator 809, and generate a decision 826 based on the comparison result. For example, comparator 810 can generate a logical one for decision 826 if analog voltage 806 equals or exceeds the threshold generated by threshold generator 809. Comparator 810 can also generate a logical zero for decision 826 if the analog voltage falls below the threshold. Decision 826 can control the count values of counter 811 to be stored in memory 812 as a result of the quantization operation.

Figure 9B:
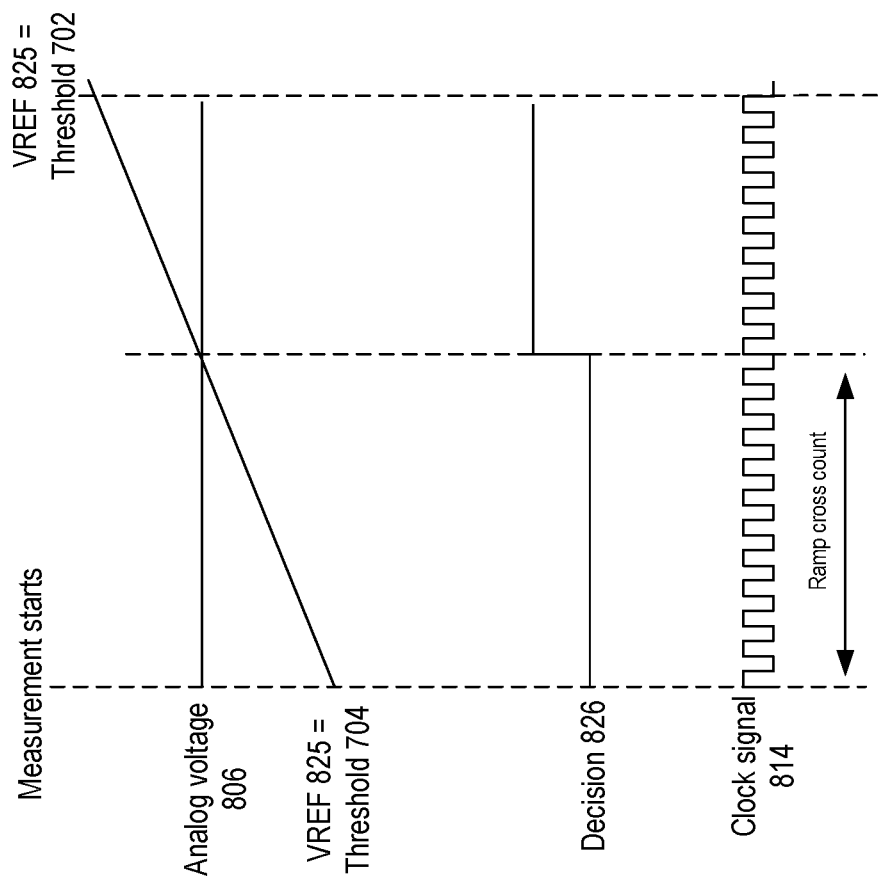
FIGS. 9A and 9B illustrate example methods for determining a light intensity.
Figure 9A:
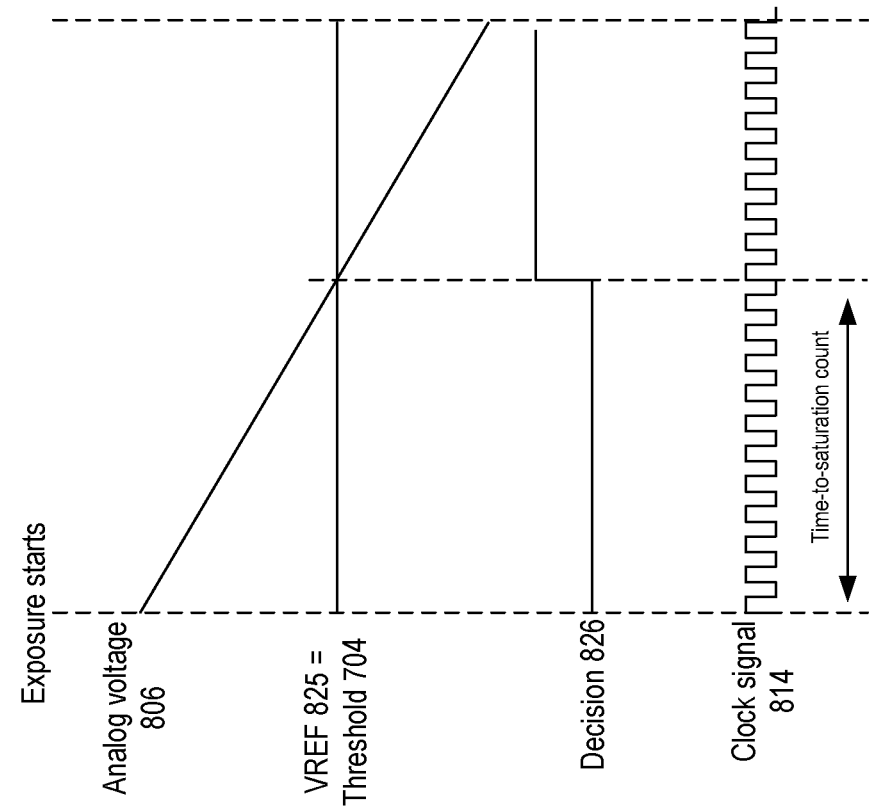

FIG. 9A illustrates an example of time-to-saturation measurement by ADC 808. To perform the time-to-saturation measurement, threshold generator 809 can control DAC 823 to generate a fixed VREF 825. Fixed VREF 825 can be set at a voltage corresponding a charge quantity threshold for saturation of charge storage device 608a (e.g., threshold 704 of FIG. 7). Counter 811 can start counting right after the exposure period starts (e.g., right after shutter switch 603 is disabled). As the analog voltage at analog output node 614 ramps down (or up depending on the implementation), clock signal 814 keeps toggling to update the count value at counter 811. The analog voltage may reach the fixed threshold at a certain time point, which causes decision 826 by comparator 810 to flip. The flipping of decision 826 may stop the counting of counter 811, and the count value at counter 811 may represent the time-to-saturation. As to be discussed in more details below, a rate of charge accumulation at charge storage device 608a can also be determined based on the duration, and the incident light intensity can be determined based on the rate of charge accumulation.

FIG. 9B illustrates an example of quantizing an analog voltage by pixel ADC 808. After measurement starts, DAC 823 may be programmed by counter output 714 to generate a ramping VREF 825, which can either ramp up (in the example of FIG. 9B) or ramp down depending on implementation. The voltage range of ramping VREF 825 can be between threshold 704 (charge quantity threshold for saturation of charge storage device 608a) and threshold 702 (charge quantity threshold for saturation of photodiode 602), which can define the medium light intensity range. In the example of FIG. 9B, the quantization process can be performed with uniform quantization steps, with VREF 825 increasing (or decreasing) by the same amount for each clock cycle of clock signal 814. The amount of increase (or decrease) of VREF 825 corresponds to a quantization step. When VREF 825 reaches within one quantization step of the analog voltage 806, decision 826 by comparator 810 flips. The flipping of decision 826 may stop the counting of counter 811, and the count value can correspond to a total number of quantization steps accumulated to match, within one quantization step, the analog voltage. The count value can become a digital representation of the quantity of charge stored at charge storage device 608a, as well as the digital representation of the incident light intensity. As discussed above, the quantization of the analog voltage can occur during the exposure period (e.g., for medium light intensity range 708) and after the exposure period (e.g., for low light intensity range 706).

As discussed above, ADC 808 can introduce quantization errors when there is a mismatch between a quantity of charge represented by the quantity level output by ADC 808 (e.g., represented by the total number of quantization steps) and the actual input quantity of charge that is mapped to the quantity level by ADC 808. The quantization error can be reduced by using a smaller quantization step size. In the example of FIG. 9B, the quantization error can be reduced by the amount of increase (or decrease) in VREF 825 per clock cycle.

Although quantization error can be reduced by using smaller quantization step sizes, area and performance speed may limit how far the quantization step can be reduced. With smaller quantization step size, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 816, which may not be feasible if pixel cell 601 is used on a head-mounted device or other wearable devices with very limited spaces. Moreover, with a larger number of quantization step size, ADC 808 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

Figures 10A, 10B:
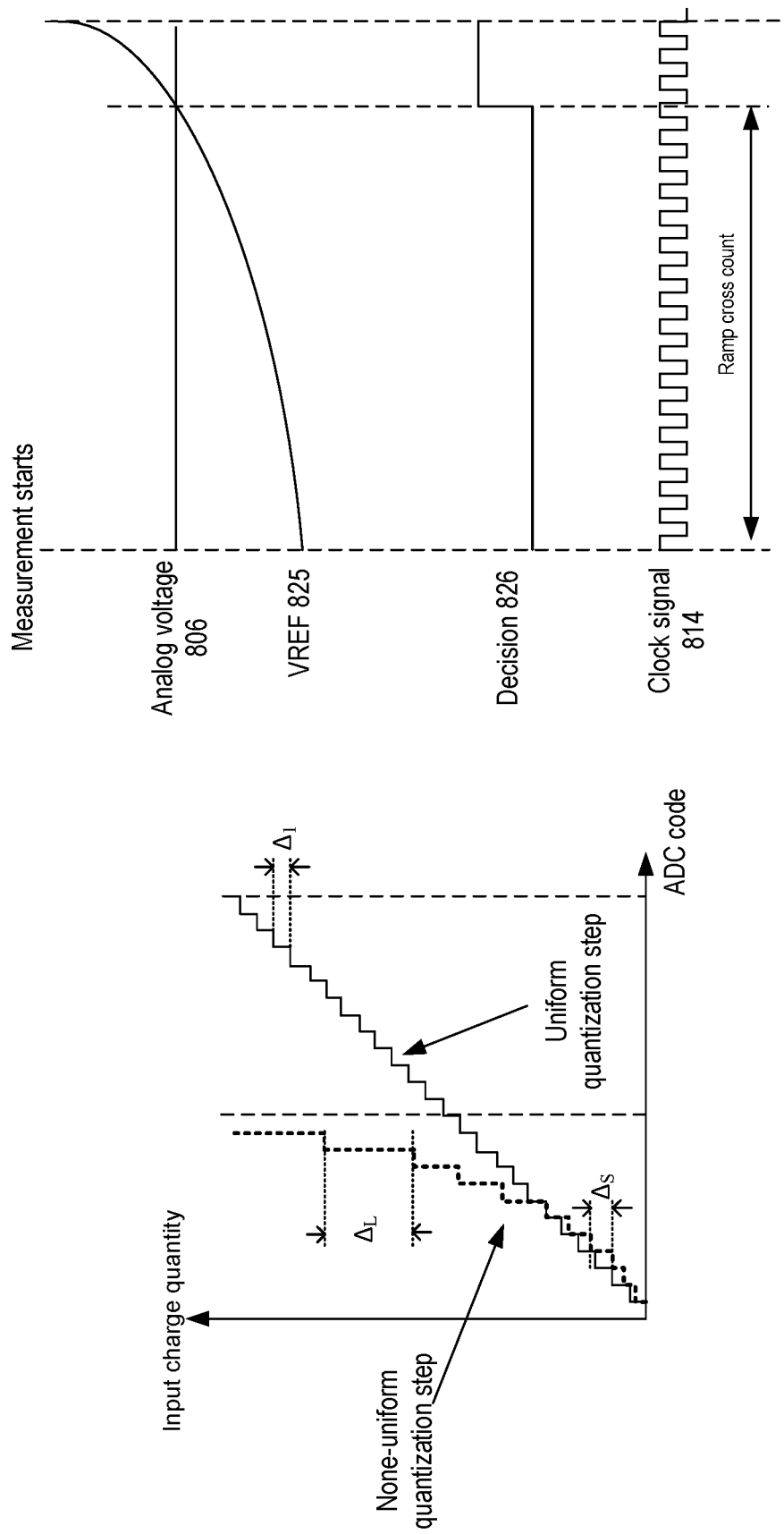
FIGS. 10A and 10B illustrate techniques for performing quantization.

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 808 can be reduced. Therefore, the reduced quantization errors can push down the lower limit of the measurable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 808 using a non-uniform quantization process. Compared with FIG. 9B (which employs a uniform quantization process), VREF 825 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 825 increases at a slower rate. For higher counter count values (which correspond to a higher input quantity range), the quantization steps are made larger, hence VREF 825 increases at a higher rate. The uneven quantization steps in VREF 825 can be introduced using different schemes. For example, as discussed above, DAC 823 is configured to output voltages for different counter count values (from counter 811). DAC 823 can be configured such that the difference in the output voltage between two neighboring counter count values (which defines the quantization step size) is different for different counter count values. As another example, counter 811 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
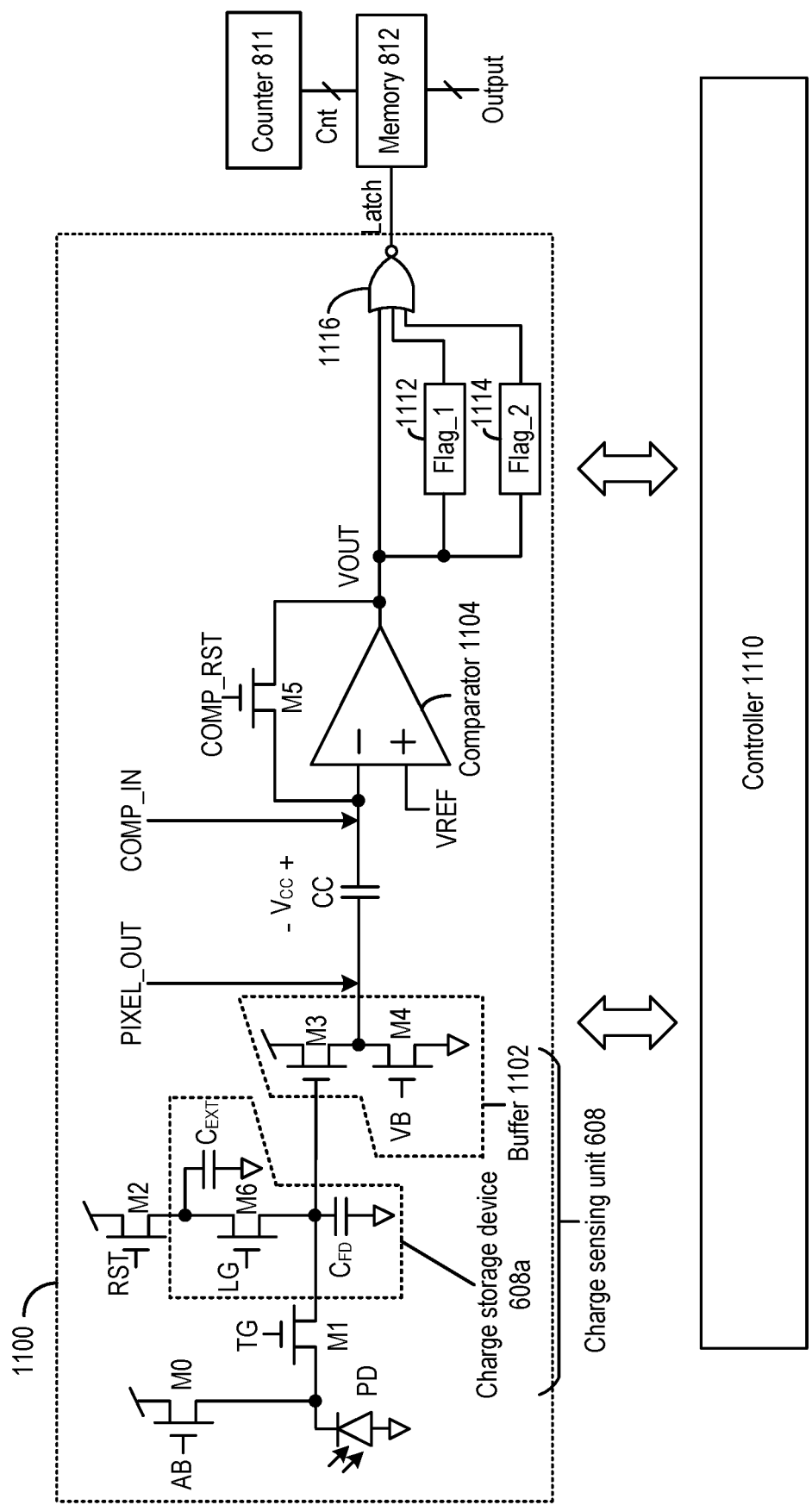
FIG. 11 illustrates block diagrams of an example of a pixel cell.

Reference is now made to FIG. 11, which illustrates an example of pixel cell 1100, which can be an example of pixel cell 601 of FIG. 6. In the example of FIG. 11, PD can correspond to photodiode 602, transistor M0 can correspond to shutter switch 603, transistor M1 can correspond to transfer switch 604, whereas transistor M2 can correspond to reset switch 803. Moreover, a combination of $C_{FD}$ capacitor (e.g., a floating drain) and $C_{EXT}$ capacitor (e.g., an MOS capacitor) can correspond to charge storage device 608a. The capacitance of charge storage device 608a is configurable by the signal LG. When LG is enabled, charge storage device 608a provides combined capacities of $C_{FD}$ and $C_{EXT}$ capacitors. When LG is disabled, the $C_{EXT}$ capacitor can be disconnected from the parallel combination, and charge storage device 608a comprises only a $C_{FD}$ capacitor (plus other parasitic capacitances). As discussed above, the capacitance of charge storage device 608a can be reduced to increase the charge-to-voltage conversion ratio for the low light intensity determination, and can be increased to provide the requisite capacity for the medium light intensity determination.

Pixel cell 1100 further includes a buffer 1102 and an example of pixel ADC 808. For example, transistors M3 and M4 can form a source follower to buffer an analog voltage developed at the PIXEL_OUT node, which represents a quantity of charge stored at charge storage device 608a. Further, the CC cap, comparator 1104, transistor switch M5, NOR gate 1112, together with memory 812, can be part of pixel ADC 808 to generate a digital output representing the analog voltage at the OF node. As described above, the quantization can be based on a comparison result (VOUT), generated by comparator 1104, between the analog voltage developed at the PIXEL_OUT node and VREF. Here, the CC cap is configured as a sampling capacitor to generate a COMP_IN voltage (at one input of comparator 1104) which tracks the output of buffer 1102 (and PIXEL_OUT), and provides the COMP_IN voltage to comparator 1104 to compare against VREF. VREF can be a static voltage for time-of-saturation measurement (for high light intensity range) or a ramping voltage for quantization of an analog voltage (for low and medium light intensity ranges). The count values (labelled "Cnt" in FIG. 11) can be generated by a free-running counter (e.g., counter 811), and the comparison result generated by comparator 1104 can determine the count values to be stored in memory 812 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 can include features that can further improve the accuracy of the incident light intensity determination. For example, the combination of the CC capacitor, transistor M5, as well as transistor M2, can be operated to perform a correlated double sampling operation to compensate for measurement errors (e.g., comparator offset) introduced by comparator 1104, as well as other error signals such as, for example, reset noise introduced to charge storage device 608a by transistor M2.

In addition, pixel cell 1100 further includes a controller 1110, which can include digital logic circuits and can be part of or external to ADC 808. Controller 1110 can generate a sequence of control signals, such as AB, TG, RST, COMP_RST, etc., to operate pixel cell 1100 to perform a three-phase measurement operation corresponding to the three light intensity ranges of FIG. 7 (e.g., low light intensity range 706, medium light intensity range 708, and high light intensity range 710), and to perform the measurement error compensation operations as described above. In each phase, pixel cell 1100 can be operated in a measurement mode targeted for the corresponding light intensity range, and determine whether the incident light intensity falls within the corresponding light intensity range based on the decision output (VOUT) of comparator 1104. Pixel cell 1100 further includes a set of registers to store the decision outputs of some of the phases as FLAG_1 and FLAG_2 signals. Based on the FLAG_1 and FLAG_2 signals, controller 1110 can select the count value output in one of the three phases to represent the incident light intensity. The selected count value can be stored in memory 812, and memory 812 can be locked based on a combination of the FLAG_1 and FLAG_2 signals by NOR gate 1116 to prevent subsequent measurement phases from overwriting the selected ADC code output in memory 812. At the end of the three-phase measurement process, controller 1110 can retrieve the count value stored in memory 812 and provide the count value as the digital output representing the incident light intensity.

Figure 12:
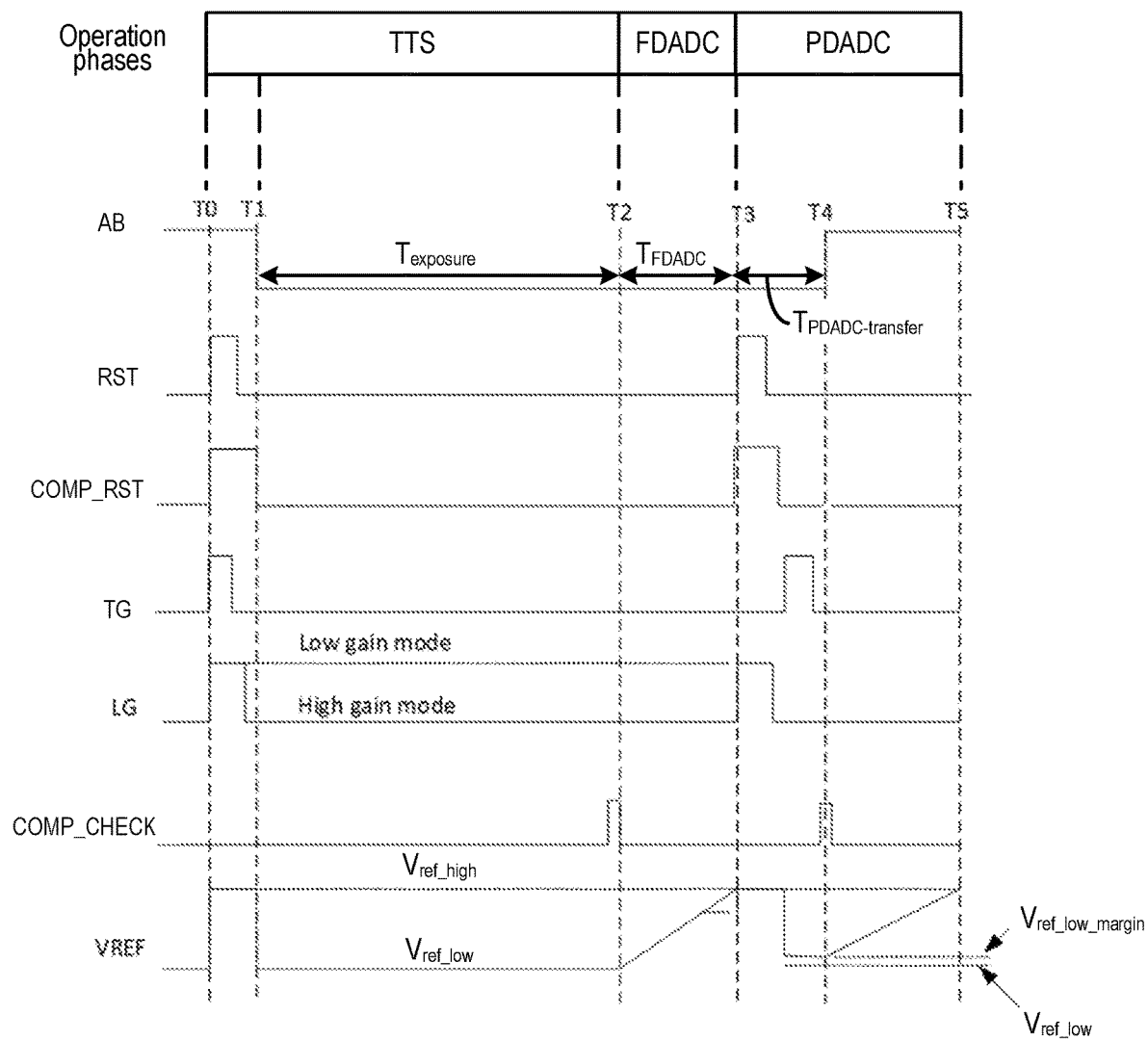
FIG. 12 illustrates an example sequence of control signals to perform light intensity measurement.

Reference is now made to FIG. 12, which illustrate an example sequence of the control signals of pixel cell 1100 for measurement of incident light intensity. FIG. 12 illustrates the change of AB, RST, COMP_RST, TG, LG, and VREF with respect to time. Referring to FIG. 12, the period between times T0 and T1 can correspond to a first reset phase, in which charge storage device 608a and comparator 1104 can be put in a reset state by controller 1110 by asserting the RST and COMP_RST signals, while the shutter signal AB can be asserted to prevent charge generated by photodiode PD from reaching charge storage device 608a. Both RST and LG signals are asserted to reset $C_{FD}$ and $C_{EXT}$ capacitors to set PIXEL_OUT at the reset level. With COMP_RST signal asserted and the positive terminal of comparator 1104 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC cap to store a $V_{CC}$ voltage including the components of the comparator offset, the reset noise, and PIXEL_OUT voltage at the reset level, as follows:

$$V_{cc}(T1)=(V_{ref\_high}+V_{comp\_offset})-(V_{pixel\_out\_rst}+V\sigma_{KTC}) \quad \text{(Equation 1)}$$

At time T1, the RST signal, the AB signal, and the COMP_RST signal are released, which starts an exposure period (labelled $T_{exposure}$) in which photodiode PD can accumulate and transfer charge. Exposure period $T_{exposure}$ can end at time T2. Between times T1 and T3, TG signal can set transfer switch M1 in a partially turned-on state to allow PD to accumulate residual charge before photodiode PD saturates. If the light intensity in the medium or high intensity ranges of FIG. 7, photodiode PD can saturate and transfer overflow charge via transfer switch M1. LG signal can remain asserted to operate in low gain mode, in which both $C_{FD}$ capacitor and $C_{EXT}$ capacitor are connected in parallel to form charge storage device 608a to store the overflow charge. The overflow charge develops a new PIXEL_OUT voltage, $V_{pixel\_out\_sig1}$. The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx)=V_{pixel\_out\_sig1}-V_{pixel\_out\_rst}+V_{ref\_high}+V_{comp\_offset} \quad \text{(Equation 2)}$$

In Equation 2, the difference between $V_{pixel\_out\_sig1}-V_{pixel\_out\_rst}$ represents the quantity of overflow charge stored in charge storage device 608a. The comparator offset in the COMP_IN voltage can also cancel out the comparator offset introduced by comparator 1104 when performing the comparison.

Between times T1 and T3, two phases of measurement of the COMP_IN voltage can be performed, including a time-to-saturation (TTS) measurement phase for high light intensity range 710 and an FD ADC phase for measurement of overflow charge for medium light intensity 708. Between times T1 and T2 ($T_{exposure}$) the TTS measurement can be performed by comparing COMP_IN voltage with a static $V_{ref\_low}$ representing a saturation level of charge storage device 608a by comparator 1104. When PIXEL_OUT voltage reaches the static VREF, the output of comparator 1104 (VOUT) can trip, and a count value from counter 811 at the time when VOUT trips can be stored into memory 812. At time T2, controller 1110 can determine the state of VOUT of comparator 1104 at the end of the TTS phase, and can assert FLAG_1 signal if VOUT is asserted. The assertion of the FLAG_1 signal can indicate that charge storage device 608a saturates and can prevent subsequent measurement phases (FD ADC and PD ADC) from overwriting the count value stored in memory 812. The count value from TTS can then be provided to represent the intensity of light received by the photodiode PD during the integration period.

Between times T2 and T3 (labelled $T_{FDADC}$), the FD ADC operation can be performed by comparing COMP_IN voltage with a ramping VREF voltage that ramps from $V_{ref\_low}$ to $V_{ref\_high}$, which represents the saturation level of photodiode PD (e.g., threshold 702), as described in FIG. 9B. If VOUT of comparator 1104 trips during FD ADC, the count value of counter 811 at the time when VOUT trips can be stored in memory 812, if FLAG_1 is low which indicates that charge storage device 608a does not saturate. Although exposure period ends at time T2, between times T2 and T3 the photodiode PD remains capable of accumulating residual charge (if not saturated) or transferring overflow charge to charge storage device 608a.

Between times T3 and T4 (labelled $T_{PDADC-transfer}$) can be the second reset phase, in which both RST and COMP_RST signals are asserted to reset charge storage device 608a (comprising the parallel combination of $C_{FD}$ capacitor and $C_{EXT}$ capacitor) and comparator 1104 to prepare for the subsequent PD ADC operation. The $V_{CC}$ voltage can be set according to Equation 1.

After RST and COMP_RST are released, LG is turned off to disconnect $C_{EXT}$ from $C_{FD}$ to increase the charge-to-voltage conversion rate for the PD ADC operation. TG is set at a level to fully turn on the M1 transfer switch to transfer the residual charge stored in the photodiode PD to $C_{FD}$. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, the photodiode PD remains capable of generating additional charge in addition to the charge generated between times T1 to T3, and transferring the additional charge to charge storage device 608a. The $V_{pixel\_out\_sig2}$ also represents the additional charge transferred between times T3 and T4. At time T4, the COMP_IN voltage can be as follows:

$$V_{comp\_in}(T4)=V_{pixel\_out\_sig2}-V_{pixel\_out\_rst}+V_{ref\_high}+V_{comp\_offset} \quad \text{(Equation 3)}$$

In Equation 3, the difference between $V_{pixel\_out\_sig2}-V_{pixel\_out\_rst}$ represents the quantity of charge transferred by the photodiode to charge storage device 608a between times T3 and T4. The comparator offset in the COMP_IN voltage can also cancel out the comparator offset introduced by comparator 1104 when performing the comparison.

At time T4, the AB signal is asserted to prevent the photodiode PD from accumulating and transferring additional charge. Moreover, VREF can be set a static level $V_{ref\_low}$ margin. Comparator 1104 can compare the COMP_IN voltage with $V_{ref\_low}$ margin to determine whether the photodiode PD saturates. $V_{ref\_low}$ margin is slightly higher than $V_{ref\_low}$, which represents the saturation level of photodiode PD (e.g., threshold 702), to prevent false tripping of comparator 1104 when the quantity of residual charge is close to but does not exceed the saturation level. Controller 1110 can determine the state of VOUT of comparator 1104 and can assert FLAG_2 if VOUT is asserted to indicate that photodiode PD saturates. If the FLAG_2 is asserted, memory 812 can be locked to preserve the count value stored in memory 812 (from FD ADC) and prevents memory 812 from be overwritten by the subsequent PD ADC operation.

Between times T4 and T5, controller 1110 can perform the PD ADC operation by comparing the COMP_IN voltage with a VREF ramp that starts from $V_{ref\_low}$ margin to $V_{ref\_high}$. In PD ADC phase, $V_{ref\_high}$ can represent the minimum detectable quantity of residual charge stored in photodiode PD, whereas $V_{ref\_low}$ margin can represent the saturation threshold of photodiode PD with margin to account for dark current, as described above. If neither FLAG_1 nor FLAG_2 is asserted prior to PD ADC, the count value obtained when comparator 1104 trips during PD ADC can be stored into memory 812, and the count value from PD ADC can be provided to represent the intensity of light.

An image sensor can include a plurality of pixel cells 1100, with each pixel cell operated using the sequence of control signals as described in FIG. 12, to perform a global shutter operation. Each pixel cell 1100 can have the same global exposure period $T_{exposure}$ that starts at time T1 and ends at time T2, within which photodiode PD can generate charge in response to incident light, accumulate at least part of the charge as residual charge until the photodiode saturates, and transfer the remaining charge as overflow charge to charge storage device 608a when the photodiode saturates. However, the photodiode PD can also accumulate and transfer additional charge between times T2 and T3 ($T_{FDADC}$) and between times T3 and T4 ($T_{PDADC\text{-}transfer}$). The light received by the photodiode PD outside the global exposure period $T_{exposure}$ is parasitic light and can reduce the global shutter efficiency (GSE) of pixel cell 1100. For example, the GSE of pixel cell 1100 operated according to FIG. 12 can be as follows:

$$GSE = \frac{T_{Exposure}}{T_{Exposure} + T_{FDADC} + T_{PDADC\text{-}transfer}} \quad \text{(Equation 4)}$$

As shown in Equation 4, the GSE of pixel cell 1100 operated according to FIG. 12 is less than the ideal value of 1. A lower GSE can indicate that the pixel cell can receive parasitic light within a longer time period outside the exposure period. Parasitic light can introduce artifacts, such as motion burring, when used for imaging fast moving objects. For example, neighboring pixel cells can have different exposure periods when the intensities of light received by the pixel cells are in different intensity ranges.

Figure 13:
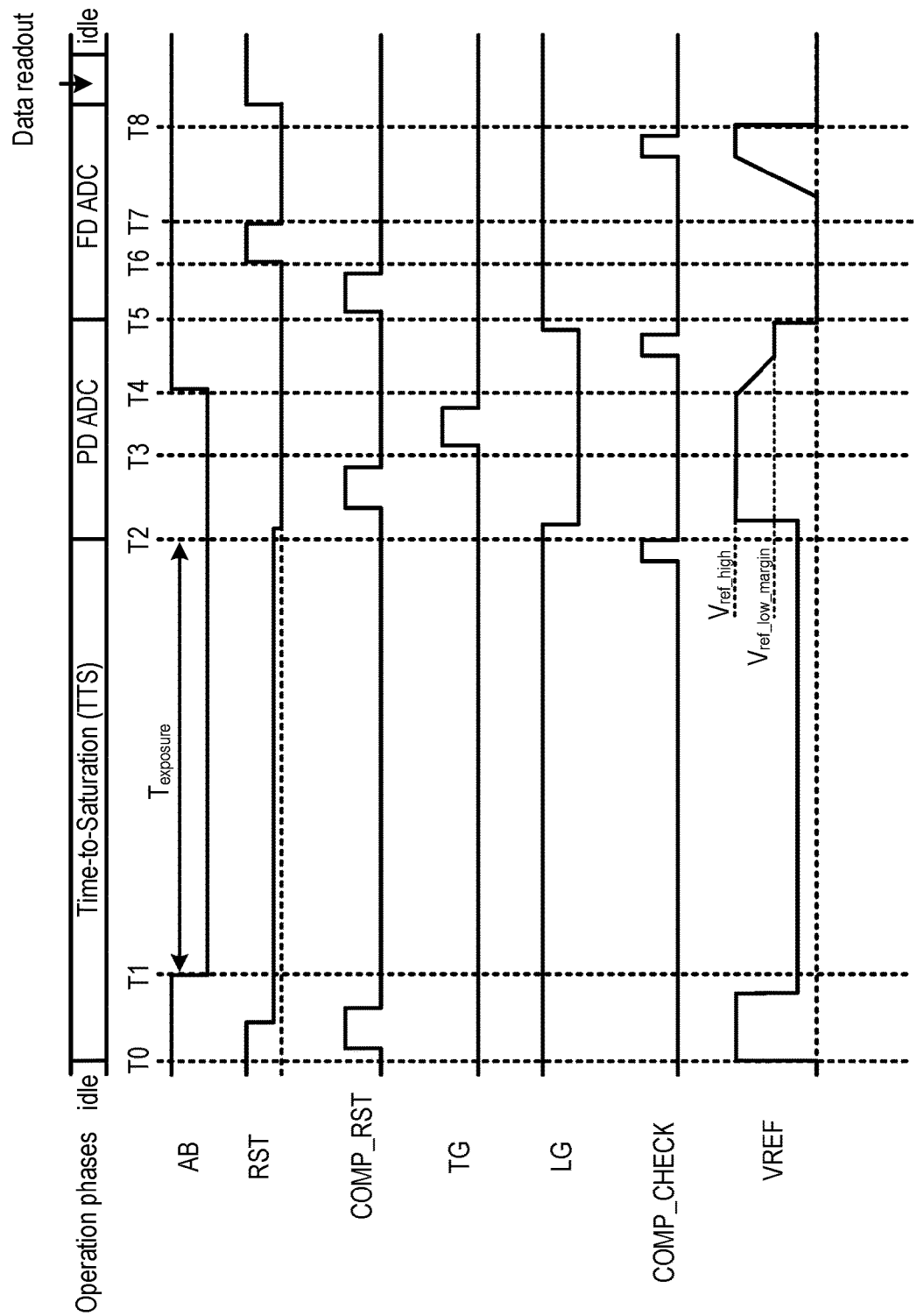
FIG. 13 illustrates another example sequence of control signals to perform light intensity measurement.

Reference is now made to FIG. 13, which illustrate an example sequence of the control signals of pixel cell 1100 for measurement of incident light intensity that can provide a higher GSE. As shown in FIG. 13, between times T0 and T1 is a first reset phase as in FIG. 12, in which both charge storage device 608a and comparator 1104 can be put in a reset state by controller 1110 by asserting the RST and COMP_RST signals, while the shutter signal AB can be asserted to prevent charge generated by photodiode PD from reaching charge storage device 608a. The reset noise and comparator offset are sampled and stored as part of $V_{CC}$ in the first reset phase. $V_{CC}$ can be set based on Equation 1 above.

At time T1, the AB, COMP_RST, and the RST signals are released, which starts an exposure period (labelled $T_{exposure}$) in which photodiode PD can accumulate and transfer charge. TG signal can set transfer switch M1 in a partially turned-on state to allow PD to transfer overflow charge to charge storage device 608a. LG signal can remain asserted to operate in low gain mode, in which both $C_{FD}$ capacitor and $C_{EXT}$ capacitor are connected in parallel to form charge storage device 608a to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 2 above.

Between times T1 and T2, a time-to-saturation (TTS) measurement can be performed by comparator 1104 comparing COMP_IN voltage with a static $V_{ref\_low}$ to generate VOUT, as in FIG. 12. The exposure period $T_{exposure}$ and TTS measurement end at time T2, when controller 1110 determines the state of VOUT of comparator 1104 and can assert FLAG_1 signal if VOUT is asserted.

Following the TTS measurement, between times T2 and T5, the PD ADC operation can be performed to measure the residual charge stored in the photodiode PD. The LG signal is de-asserted to disconnect $C_{EXT}$ from $C_{FD}$ to increase charge-to-voltage conversion ratio, as described above. The overflow charge (if any) is divided between $C_{FD}$ and $C_{EXT}$ based on a ratio of capacitances between $C_{FD}$ and $C_{EXT}$ such that $C_{FD}$ stores a first portion of the overflow charge and $C_{EXT}$ stores a second portion of the overflow charge. $V_{pixel\_out\_sig1}$ can correspond to the first portion of the overflow charge stored in $C_{FD}$.

To prepare for the PD ADC operation, between times T2 and T3, COMP_RST signal is asserted again to reset comparator 1104. The resetting of comparator 1104 can set a new $V_{CC}$ voltage across the CC capacitor based on a difference between $V_{pixel\_out\_sig1}$ and the output of comparator 1104 in the reset state, as follows:

$$V_{cc}(T3) = (V_{ref\_high} + V_{comp\_offset}) - (V_{pixel\_out\_sig1}(T3) + V\sigma_{KTC}) \quad \text{(Equation 5)}$$

Between times T3 and T4, COMP_RST signal is released so that comparator 1104 exits the reset state. Moreover, the TG signal can set transfer switch M1 in a fully turned-on state to transfer the residual charge to $C_{FD}$. The residual charge can be added to the overflow charge in $C_{FD}$, which changes the PIXEL_OUT voltage to $V_{pixel\_out\_sig2}$. The new PIXEL_OUT voltage can be AC coupled into a new COMP_IN voltage at time T4, as follows:

$$V_{comp\_in}(T4) = V_{pixel\_out\_sig2} - V_{pixel\_out\_sig1}(T3) + V_{ref\_high} + V_{comp\_offset} \quad \text{(Equation 6)}$$

In Equation 6, the difference between $V_{pixel\_out\_sig2} - V_{pixel\_out\_sig1}(T3)$ represents the quantity of residual charge transferred by the photodiode to charge storage device 608a between times T3 and T4.

In FIG. 13, after TG is fully turned-on between times T3 and T4, the TG is de-asserted to disconnect the photodiode PD from $C_{FD}$ and $C_{EXT}$. As a result, no additional charge is transferred to $C_{FD}$ and $C_{EXT}$ after time T4 until the start of next exposure period. Such arrangements can increase GSE and reduce the effect of parasitic light, which may include light received by the photodiode PD outside the exposure period $T_{exposure}$, on the stored charge. The GSE of pixel cell 1100 operated according to FIG. 13 can be as follows:

$$GSE = \frac{T_{Exposure}}{T_{Exposure} + T4 - T2} \quad \text{(Equation 7)}$$

The GSE in Equation 7 can be much higher than the GSE in Equation 4, at least because the duration of time between times T4 and T2 in FIG. 13 does not include the full PD ADC or FD ADC operation in which a full VREF ramp is cycled through to compare with the COMP_IN voltage.

Between times T4 and T5, controller 1110 can perform the PD ADC operation by comparing the COMP_IN voltage with a VREF ramp that starts from $V_{ref\_high}$ to $V_{ref\_low}$ margin. In PD ADC phase, $V_{ref\_high}$ can represent the minimum detectable quantity of residual charge stored in photodiode PD, whereas $V_{ref\_low}$ margin can represent the saturation threshold of photodiode PD with margin to account for dark current, as described above. If FLAG_1 is asserted prior to PD ADC, the count value obtained when comparator 1104 trips during PD ADC can be stored into memory 812, and the count value from the PD ADC operation can be provided to represent the intensity of light.

Moreover, towards time T5, controller 1110 can also check whether the COMP_IN voltage falls below $V_{ref\_low}$ margin, which can indicate whether the photodiode PD saturates. If the COMP_IN voltage falls below $V_{ref\_low}$ margin, which indicates the photodiode PD saturates, controller 1110 can de-assert FLAG_2 to allow the subsequent FD ADC operation to overwrite the count value stored in memory 812 (if FLAG_1 is also de-asserted). If the COMP_IN voltage stays above $V_{ref\_low}$ margin, controller 1110 can assert FLAG_2 to lock the count value stored by the PD ADC operation.

Between times T5 and T8, a FD ADC operation can be made to measure the overflow charge transferred by the photodiode PD within the exposure period $T_{exposure}$. As photodiode PD remains disconnected from $C_{FD}$ and $C_{EXT}$, no additional charge is transferred to $C_{FD}$ and $C_{EXT}$, and the total charge stored in $C_{FD}$ and $C_{EXT}$ is mostly generated in the exposure period $T_{exposure}$, together with additional charge generated by the photodiode between times T3 and T4. With such arrangement, the GSE of pixel At time T5, the LG signal is asserted to connect $C_{FD}$ with $C_{EXT}$, which allows the second portion of the overflow charge stored in $C_{EXT}$ to combine with the first portion of the overflow charge and the residual charge stored in $C_{FD}$, and a new PIXEL_OUT voltage $V_{pixel\_out\_sig3}$ can develop at the parallel combination of $C_{FD}$ and $C_{EXT}$. $V_{pixel\_out\_sig3}$ can represent a total quantity of residual charge and overflow charge generated by the photodiode PD between times T1 and T2, plus charge generated between times T2 and T4 due to parasitic light. Controller 1110 can perform the FD ADC operation to quantize $V_{pixel\_out\_sig3}$ and, if FLAG_2 indicates that photodiode saturates, provide the quantization result of $V_{pixel\_out\_sig3}$ to represent the intensity of light within the exposure period $T_{exposure}$.

Between times T5 and T7, a double sampling technique can be performed to mitigate the effect of reset noise and comparator offset on the FD ADC operation. Specifically, between times T5 and T6, comparator 1104 can be reset as part of the first sampling operation. The positive terminal of comparator 1104 is connected to the lower end of VREF, $V_{ref\_low}$. The $V_{CC}$ voltage can include components of reset noise and comparator offset as described above. The $V_{CC}$ voltage can be as follows:

$$V_{cc}(T5)=(V_{ref\_low}+V_{comp\_offset})-(V_{pixel\_out\_sig3}+V\sigma_{KTC1}) \quad \text{(Equation 8)}$$

Between times T6 and T7, both $C_{FD}$ and $C_{EXT}$ can be reset, while comparator 1104 exits the reset state, as part of a second sampling operation. As a result of resetting, PIXEL_OUT can be reset to a reset voltage $V_{pixel\_out\_rst}$. Moreover, second reset noise charge is also introduced into charge storage device 608a, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6)=V_{pixel\_out\_rst}+V\sigma_{KTC2} \quad \text{(Equation 9)}$$

At time T7, COMP_RST is released, and comparator 1104 exits the reset state. Via AC-coupling, the COMP_IN voltage can track $V_{pixel\_out}(T6)$ in addition to $V_{cc}(T5)$ as follows:

$$V_{comp\_in}(T7)=(V_{ref\_low}+V_{comp\_offset})+(V_{pixel\_out\_rst}-V_{pixel\_out\_sig3})+(V\sigma_{KTC2}-V\sigma_{KTC1}) \quad \text{(Equation 10)}$$

The noise/offset compensation scheme as described above in Equations 8-10 can be used for PD ADC to mitigate the effect of leakage on the sampled noise/offset information in the $V_{CC}$ voltage. PD ADC can be more susceptible to leakage than FD ADC as it takes place after FD ADC, which allows more time for leakage to impact the $V_{CC}$ voltage and the sampled noise/offset information represented by the $V_{CC}$ voltage.

Following the second sampling operation, the COMP_IN voltage can be quantized by comparing against a VREF ramp between times T7 and T8. The VREF ramp can start from $V_{ref\_low}$, which can represent a minimum quantity of overflow charge detectable in charge storage device 608a including $C_{EXT}$ and $C_{FD}$, and $V_{ref\_high}$, which can represent the quantity of overflow charge when charge storage device 608a saturates. A count value from counter 811 when VOUT trips can be stored into memory 812 to represent the intensity of light received in the exposure period. After time T8, the digital value stored in memory 812 can be read out to represent the intensity of light received by the photodiode PD within the exposure period $T_{exposure}$.

As shown in Equation 8, the polarity of comparison in PD ADC operation, where $V_{comp\_in}$ represents $V_{pixel\_out\_sig2}-V_{pixel\_out\_sig1}(T3)$, is opposite to the polarity of comparison in FD ADC operation, where $V_{comp\_in}$ represents $V_{pixel\_out\_rst}-V_{pixel\_out\_sig3}$. In PD ADC, the VOUT of comparator 1104 of FIG. 11 becomes a logical zero when COMP_IN voltage is higher than $V_{ref\_low}$ margin, which indicates the photodiode PD does not saturate. But in order to store the digital value when VOUT trips, which represents a measurement of the residual charge, into memory 812, memory 812 needs to receive a positive VOUT from comparator 1104. In contrast, in FD ADC, the VOUT of comparator 1104 of FIG. 11 becomes a logical one when COMP_IN voltage is higher than $V_{ref\_low}$, which indicates that the overflow charge exceeds the minimum detectable level.

In FIG. 13, the overflow charge $Q_{ov}$ and the residual charge $Q_{res}$ can be determined based on the PD ADC output voltage (V1, also called "first voltage") and the FD ADC output voltage (V2, also called "second voltage") follows:

$$V1 = \left(Q_{res} + \frac{C_{FD}}{C_{FD}+C_{EXT}} \times Q_{ov}\right) \times C_{FD} \quad \text{(Equation 11)}$$

$$V2 = (Q_{res}+Q_{ov}) \times (C_{FD}+C_{EXT}) \quad \text{(Equation 12)}$$

In Equation 11, the first voltage can be based on a quantity of the residual charge $Q_{res}$ as well as a quantity of a first portion of the overflow charge $Q_{ov}$ stored in $C_{FD}$ (based on a ratio between $C_{FD}$ and the total capacitance $C_{FD}+C_{EXT}$) prior to $C_{FD}$ being disconnected from $C_{EXT}$. In Equation 12, the second voltage can be based on the residual charge $Q_{res}$ (which remains in $C_{FD}$) and the total overflow charge $Q_{ov}$ which are redistributed within $C_{FD}+C_{EXT}$. In the scheme of FIG. 13, both FD ADC and PD ADC quantization outputs can be stored in the memory. To obtain $Q_{res}$ and $Q_{ov}$, which can be used to measure the intensity of light, a post-processor can obtain the quantization outputs of PD ADC (V1) and FD ADC (V2) and compute $Q_{res}$ and $Q_{ov}$ based on Equations 11 and 12 above. Based on whether the photodiode saturates (e.g., based on FLAG_2), the post-processor can output a digital representation of $Q_{res}$ or a digital representation of $Q_{ov}$.

Figure 14A:
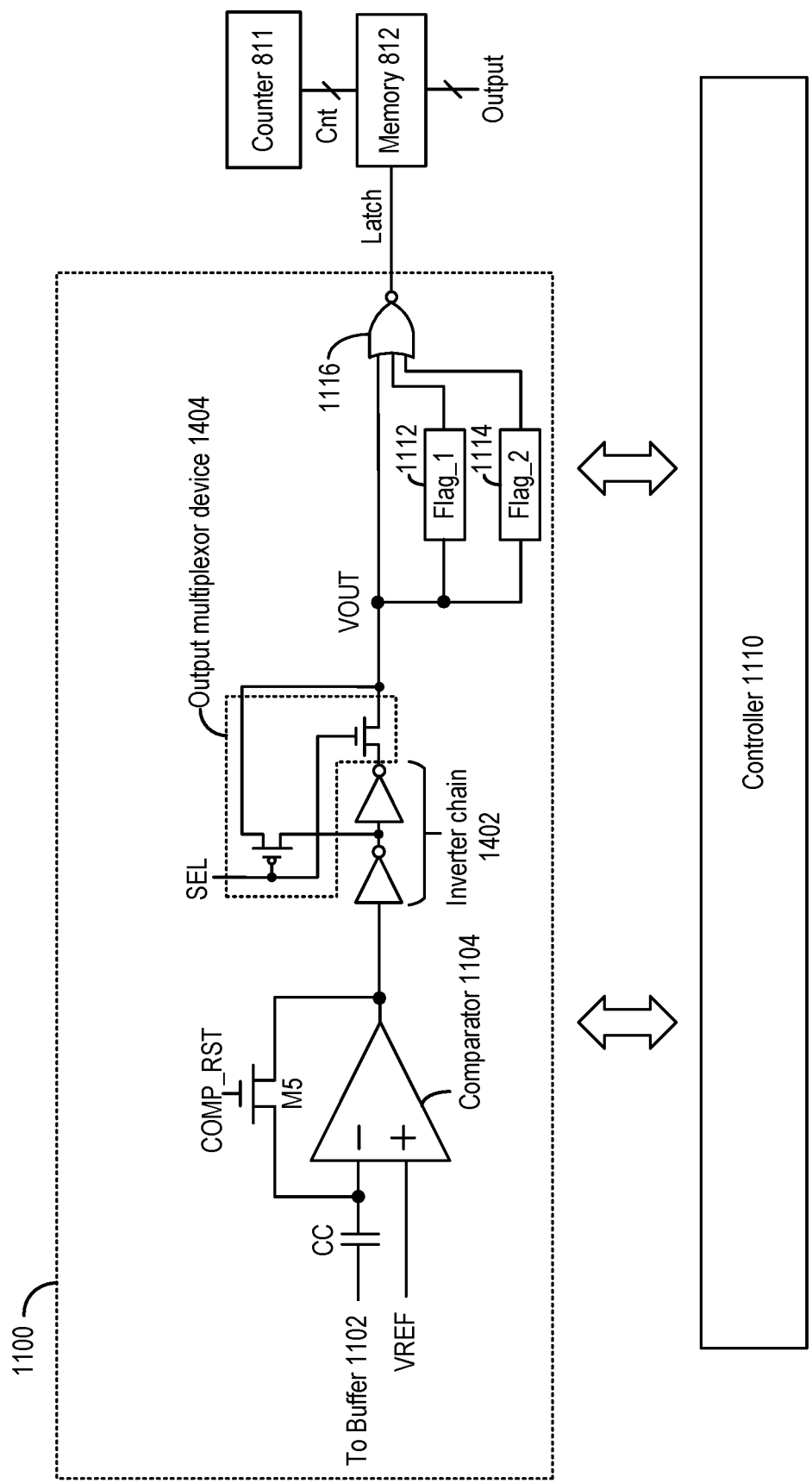
FIGS. 14A, 14B, and 14C illustrate examples of a pixel cell.
Figure 14B:
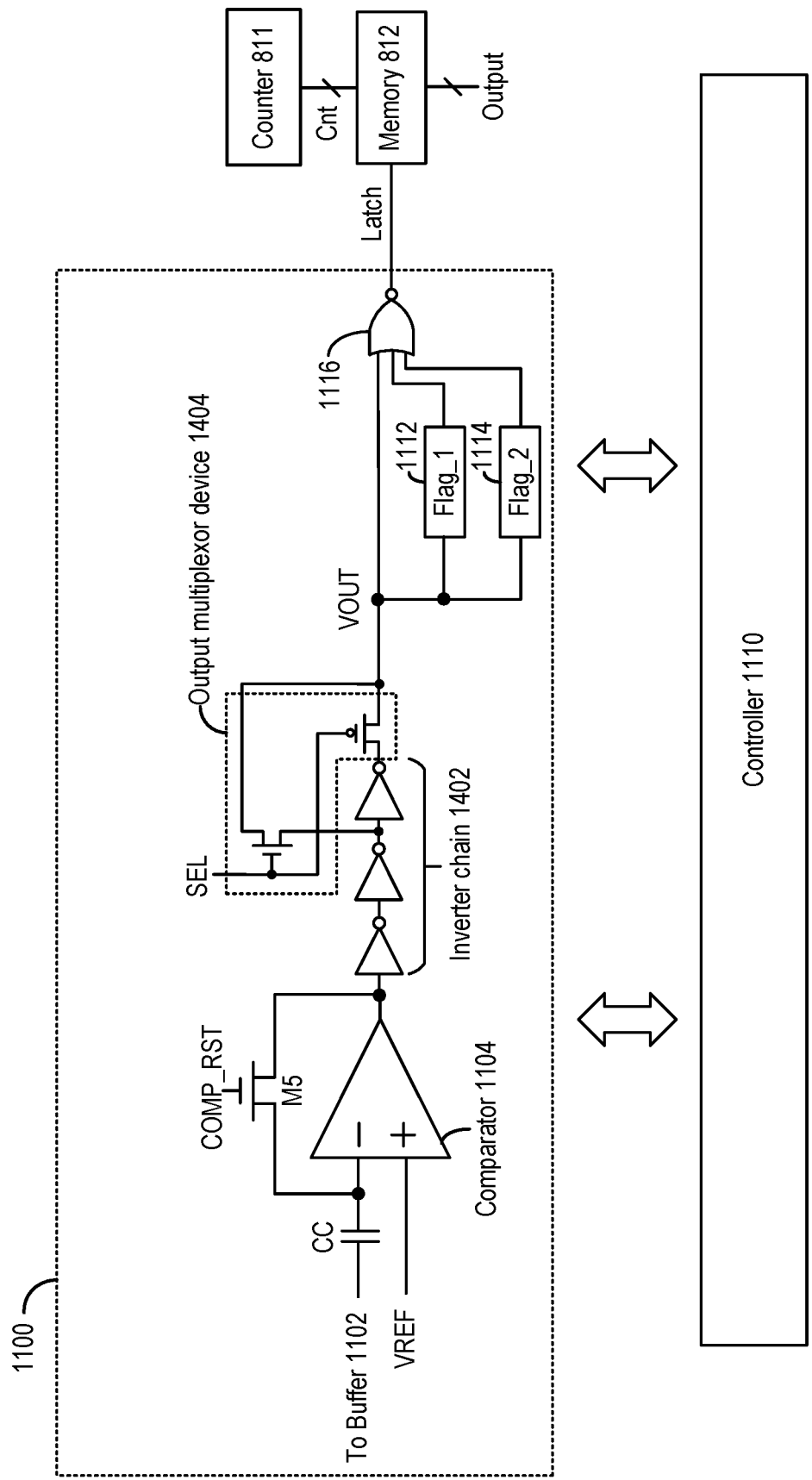
Figure 14C:
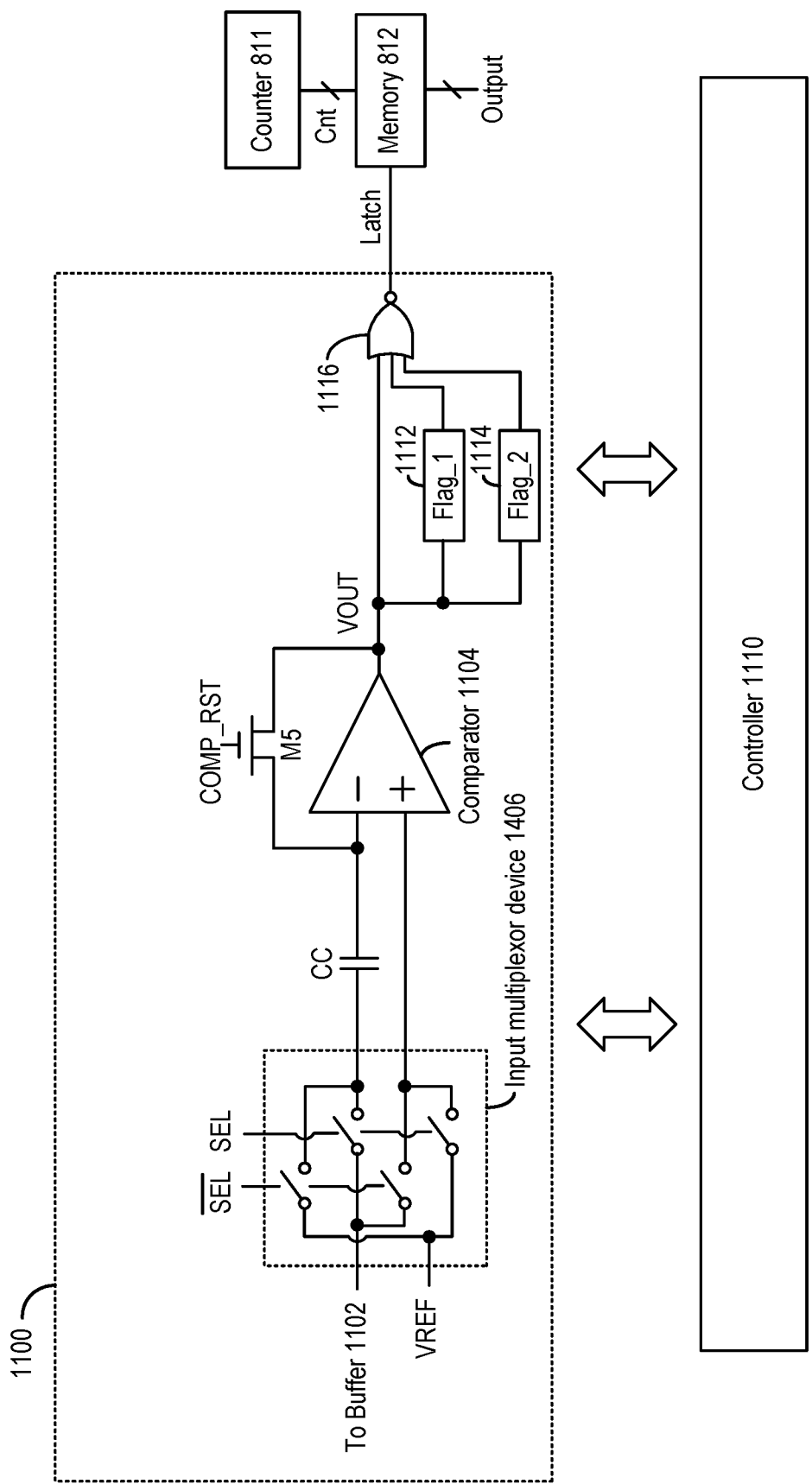

To account for the opposite polarity of comparisons between the PD ADC operation and the FD ADC operation, pixel cell 1100 can be modified to reverse the polarity of comparison of comparator 1104 between the PD ADC and FD ADC operations. FIG. 14A, FIG. 14B, and FIG. 14C provide examples of pixel cells 1100 having the polarity of comparison reversed between the PD ADC and FD ADC. As shown in FIG. 14A and FIG. 14B, a chain of inverters 1402 can be coupled between the output of comparator 1104 and the VOUT node. An output multiplexor device 1404 can be controlled by a SEL signal to select between an non-inverted version of the output of comparator 1104, or an inversed version of the output of comparator 1104, as the VOUT voltage. In some examples, the SEL signal can be based on one of the control signals in FIG. 13 which has opposite polarity between PD ADC and FD ADC operations. For example, SEL signal can be generated based on the LG signal. During PD ADC, the LG signal is de-asserted, and an inverted version of the output of comparator 1104 is provided as VOUT. During FD ADC, the LG signal is asserted, and an non-inverted version of the output of comparator 1104 is provided as VOUT.

In some examples, to reverse the polarity of comparison, the positive and negative inputs to comparator 1104 can also be swapped. FIG. 14C illustrates such an example. As shown in FIG. 14C, pixel cell 1100 can include an input multiplexor 1406. If the SEL signal (which can be generated based on the LG signal) is asserted, input multiplexor 1406 can forward the output of buffer 1102 to the left plate of CC capacitor as negative input to comparator 1104, and forward VREF as the positive input to comparator 1104. If the SEL signal is de-asserted, input multiplexor 1406 can forward the output of buffer 1102 as the positive input to comparator 1104, and forward the output of buffer 1102 as the negative input to comparator 1104. By swapping the positive and negative inputs to comparator 1104 between PD ADC and FD ADC operations, the polarity of comparison can be reversed between the two operations.

Figure 15:
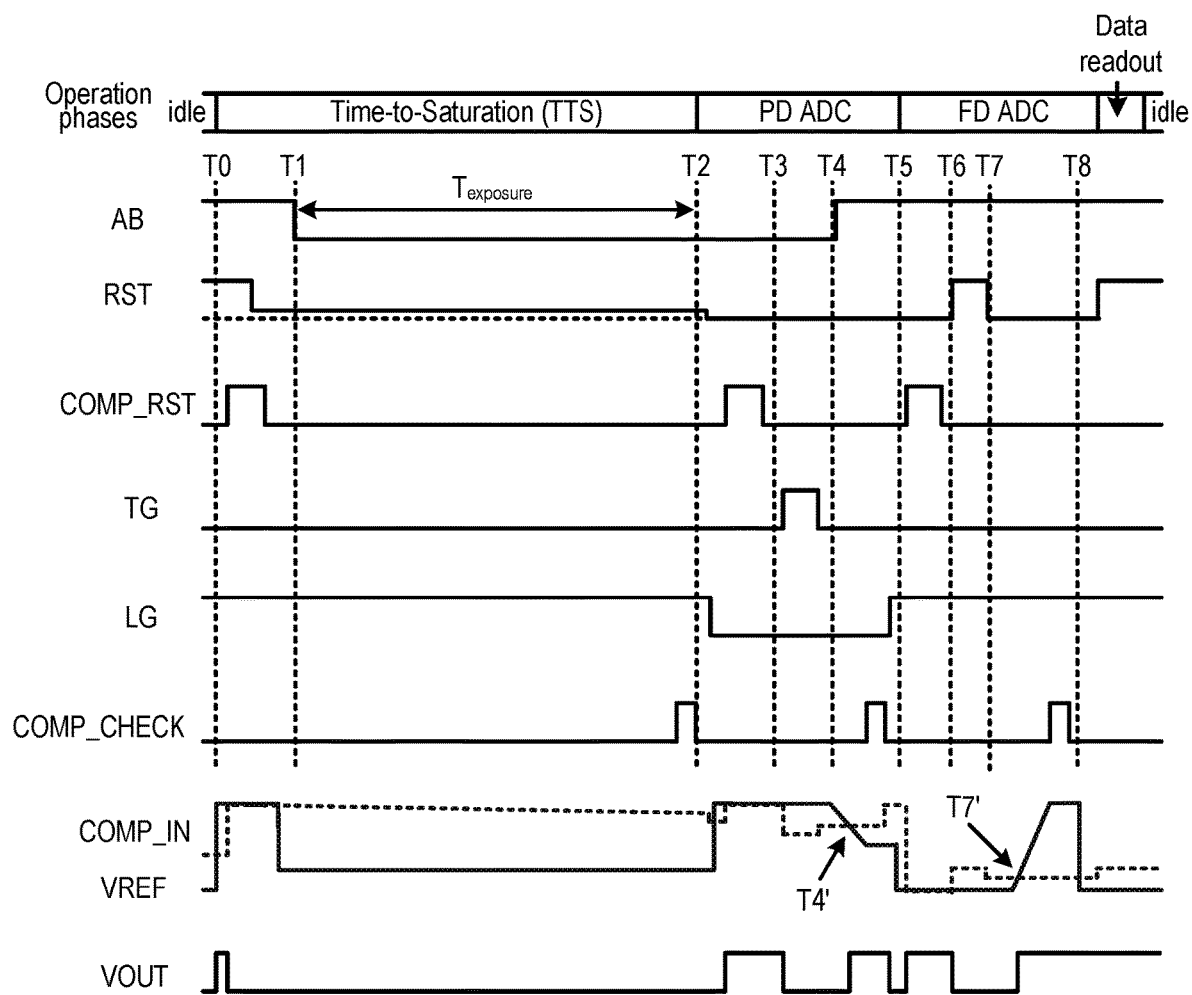
FIG. 15 illustrates an example sequence of outputs of example pixel cells of FIGS. 14A, 14B, and 14C based on the example sequence of control signals in FIG. 13.

FIG. 15 illustrates an example of changes of COMP_IN and VOUT voltages with respect to time based on the control signal sequence of FIG. 13 and the modified pixel cell 1100 of FIG. 14A-FIG. 14C. As shown in FIG. 15, at time T4', VREF falls below the COMP_IN voltage in the PD ADC operation, which indicates that photodiode PD does not saturate. While the output of comparator 1104 is a logical zero, an inverted version of the output of comparator 1104 is provided as VOUT, and memory 812 can latch in a count value from the PD ADC operation. Moreover, at time T7', VREF rises above the COMP_IN voltage in the FD ADC operation. The output of comparator 1104 is a logical one. An non-inverted version of the output of comparator 1104 is provided as VOUT, but as FLAG_2 is asserted, memory 812 is locked, and the count value from the FD ADC operation is not stored in memory 812.

The operation in FIG. 13, in which the residual charge is combined with the overflow charge in the $C_{FD}$ and $C_{EXT}$ for the PD ADC operation and FD ADC operation, can lead to large voltage swing at $C_{FD}$ and $C_{EXT}$ as well as large swing of PIXEL_OUT and COMP_IN voltages. As the available voltage swing is limited by the supply voltage to pixel cell 1100, the capacities of $C_{FD}$ and $C_{EXT}$ for storing the charge from the photodiode PD, and the range of measurable light intensities, can be limited as a result. To increase the capacities of $C_{FD}$ and $C_{EXT}$ for storing the charge from the photodiode PD, the overflow charge stored in $C_{FD}$ can be removed after $C_{EXT}$ is disconnected from $C_{FD}$ but prior to the photodiode PD transfers the residual charge to $C_{FD}$ for the PD ADC operation. Such arrangements, however, can reduce the signal to noise ratio as part of the charge representing the light intensity has been removed.

Figure 16:
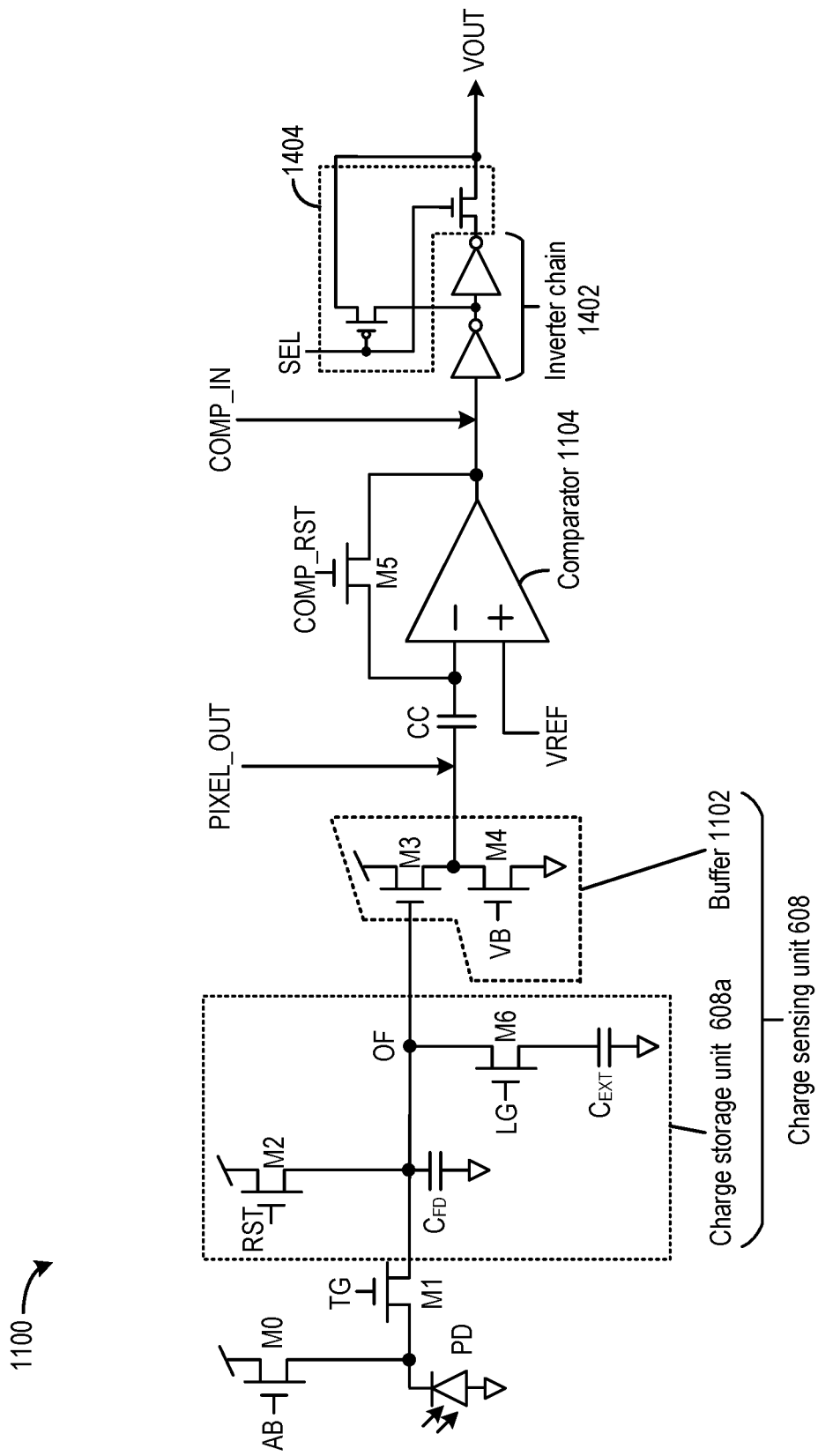
FIG. 16 illustrates another example of a pixel cell.

FIG. 16 illustrates a modified pixel cell 1100 that supports the removal of overflow charge from $C_{FD}$ prior to the PD ADC operation. As shown in FIG. 16, transistor M2, which is configured as reset switch 803, is directly coupled to $C_{FD}$ at OF node. Moreover, switch M6, controlled by LG signal, also couples between the OF node and $C_{EXT}$. With the arrangements in FIG. 16, the assertion of RST signal can reset $C_{FD}$ alone if the LG signal is de-asserted, or can reset $C_{FD}$ and $C_{EXT}$ if the LG signal is asserted.

In FIG. 16, the overflow charge $Q_{ov}$ and the residual charge $Q_{res}$ can be determined based on the PD ADC output voltage (V1) and the FD ADC output voltage (V2) follows:

$$V1 = Q_{res} \times C_{FD} \qquad \text{(Equation 13)}$$

$$V2 = \left(Q_{res} + \frac{C_{EXT}}{C_{FD} + C_{EXT}} \times Q_{ov}\right) \times (C_{FD} + C_{EXT}) \qquad \text{(Equation 14)}$$

In Equation 13, the first voltage can be based on a quantity of the residual charge $Q_{res}$ stored in $C_{FD}$ as the first portion of overflow charge is removed from $C_{FD}$ prior to transfer of the residual charge. In Equation 14, the second voltage can be based on the residual charge $Q_{res}$ (which remains in $C_{FD}$) and a second portion of overflow charge $Q_{ov}$ which $C_{EXT}$ receives prior to being disconnected from $C_{FD}$ which are redistributed within $C_{FD}+C_{EXT}$. The second portion can be based on a ratio between $C_{EXT}$ and total capacitance $C_{FD}+C_{EXT}$. To obtain $Q_{res}$ and $Q_{ov}$, which can be used to measure the intensity of light, a post-processor can obtain the quantization outputs of PD ADC (V1) and FD ADC (V2) and compute $Q_{res}$ and $Q_{ov}$ based on Equations 13 and 14 above. Based on whether the photodiode saturates, the post-processor can output a digital representation of $Q_{res}$ or a digital representation of $Q_{ov}$.

Figure 17:
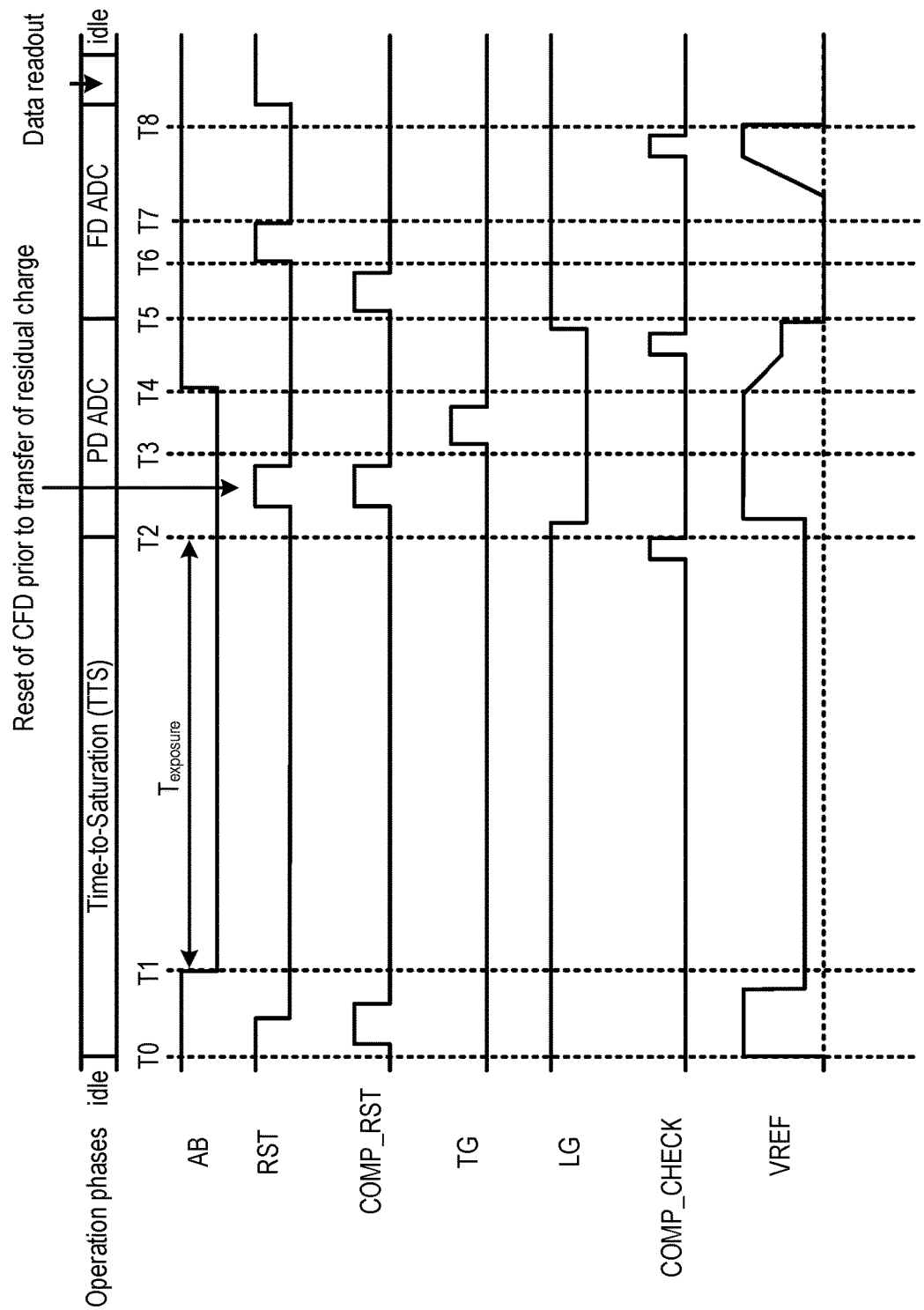
FIG. 17 illustrates an example sequence of control signals to perform light intensity measurement using the example pixel cell of FIG. 16.

FIG. 17 illustrates an example sequence of control signals for the pixel cell 1100 of FIG. 16. The sequence of control signals for the first reset phase (times T0-T1) and time-to-saturation operation (times T1 to T2) is the same as FIG. 13. After the TTS operation, between times T2 and T3, the LG signal is de-asserted to disconnect $C_{EXT}$ from $C_{FD}$. The overflow charge received from the photodiode PD between times T1 and T2 can be split between $C_{FD}$ and $C_{EXT}$ based on their ratio of capacitances. $C_{FD}$ can store the first portion of the overflow charge, whereas $C_{EXT}$ can store the second portion of the overflow charge, as described above. Moreover, both RST and COMP_RST signals are asserted. The assertion of RST signal can reset $C_{FD}$ and remove the first portion of the overflow charge, whereas the second portion of the overflow charge remains in $C_{FD}$.

Between times T3 and T4, the TG signal can set the M1 switch at the fully-on state to transfer the residual charge from the photodiode PD to $C_{FD}$, which is emptied of charge prior to the transfer by the assertion of the RST signal between times T2 and T3. A PD ADC operation is performed to quantize the residual charge between times T4 and T5 as described above.

Between times T5 and T8, the LG signal can be asserted to reconnect the $C_{FD}$ with $C_{EXT}$. The residual charge stored in $C_{FD}$ can combine with the second portion of the overflow charge in $C_{EXT}$. The new PIXEL_OUT voltage $V_{pixel\_out\_sig3}$ at the parallel combination of $C_{FD}$ and $C_{EXT}$ can represent a total quantity of residual charge and the second portion of the overflow charge. The digital value obtained from the quantization of $V_{pixel\_out\_sig3}$ by the FD ADC operation can be scaled based on the ratio of capacitances between $C_{FD}$ and $C_{EXT}$ to obtain the full overflow charge.

Figure 18:
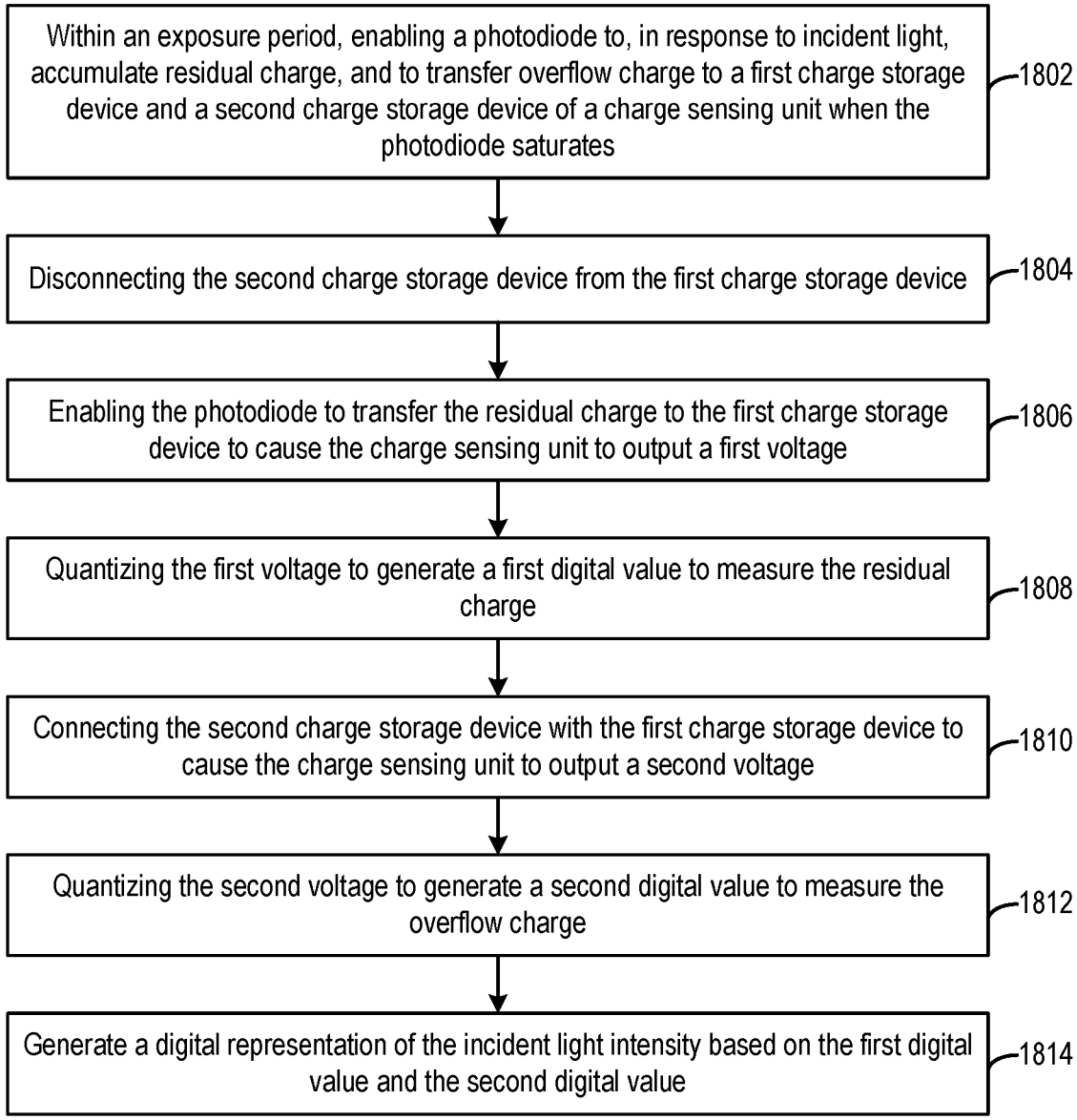
FIG. 18 illustrates a flowchart of an example process for measuring light intensity.

FIG. 18 illustrates a flowchart of an example method 1800 of measuring light intensity. Method 1800 can be performed by, for example, components of pixel cell 1100 as shown in FIG. 11, FIG. 12, FIG. 14A-FIG. 14C, and FIG. 16. The pixel cell may include a photodiode (e.g., photodiode PD), a charge sensing unit comprising a first charge storage device (e.g., $C_{FD}$), a second charge storage device (e.g., $C_{EXT}$), and a buffer (e.g., buffer 608b, buffer 1102, etc.). The pixel cell may also be coupled with an ADC including a comparator (e.g., comparator 1104) which can be part of the pixel cell, as well as a counter (e.g., counter 811) and a memory (e.g., memory 812) which can be external to the pixel cell. The pixel cell may include a transfer switch (e.g., M1) coupled between the photodiode and the charge storage devices, a shutter switch coupled with the photodiode, and a capacitor switch (e.g., M6) to connect the charge storage devices in parallel or to disconnect them. The pixel cell further includes a reset switch to reset the first charge storage device and the second charge storage device. In some examples, the reset switch can reset the first charge storage device without resetting the second charge storage device. The transfer switch, the shutter switch, the capacitor switch, and the reset switch can be controlled by a controller (e.g., controller 1110) based on example sequences of control signals as described in FIG. 13, FIG. 15, and FIG. 17.

Method 1800 starts with step 1802, in which within an exposure period (e.g., $T_{exposure}$) a controller can enable a photodiode to, in response to incident light, accumulate residual charge, and to transfer overflow charge to a first charge storage device and a second charge storage device of a charge sensing unit when the photodiode saturates. The controller can de-assert the shutter switch to allow the photodiode to accumulate residual charge. The controller can also bias the transfer switch by a bias voltage to set a residual charge capacity of the photodiode. The residual charge capacity can correspond to, for example, threshold 702 of the low light intensity range 706 of FIG. 7. After the residual charge capacity is reached, the photodiode can transfer the newly generated charge as overflow charge to the first charge storage device and the second charge storage device, which can be connected in parallel by the capacitor switch. The parallel connection can increase the total capacitance for storing the overflow charge before the charge storage devices saturates.

In step 1804, the controller can disconnect the second charge storage device from the first charge storage device. The disconnection can be based on disabling the capacitor switch. After the disconnection, the first charge storage device can store a first portion of the overflow charge received from the photodiode during the exposure period, whereas the second charge storage device can store a second portion of the overflow charge.

In step 1806, the controller can enable the photodiode to transfer the residual charge to the first charge storage device to cause the charge sensing unit to output a first voltage. The controller can fully turn on the transfer switch to remove the residual charge from the photodiode. In some examples, the controller can reset the first charge storage device (without resetting the second charge storage device), and the first voltage can be based on a quantity of the residual charge and the capacitance of the first charge storage device. In some examples, the controller does not reset the first charge storage device, and the first voltage can be based on a quantity of the residual charge, a quantity of the first portion of the overflow charge, and the capacitance of the first charge storage device. The buffer of the charge sensing unit can buffer the first voltage to increase its driving strength.

In step 1808, the controller can quantize the first voltage to generate a first digital value to measure the residual charge. The quantization can be part of the PD ADC operation by comparing, using comparator 1104, the first voltage against a first voltage ramp. The first voltage ramp can start from $V_{ref\_high}$ to $V_{ref\_low}$ margin. In PD ADC phase, $V_{ref\_high}$ can represent the minimum detectable quantity of residual charge stored in photodiode PD, whereas $V_{ref\_low}$ margin can represent the saturation threshold of photodiode PD with margin to account for dark current. The comparator can be coupled with a latch signal to memory 812. When the comparator trips, memory 812 can latch in a count value from counter 811 representing the first digital value. The first digital value can be used to measure the quantity of the residual charge based on Equations 11-14 above. In some examples, the ADC can include an AC capacitor coupled between the charge sensing unit and the comparator to sample the reset noise and the comparator offset information. The sampling can be based on resetting the comparator and the charge storage devices simultaneously to set a $V_{CC}$ voltage across the AC capacitor, and to adjust the first voltage based on the $V_{CC}$ voltage to compensate for the effect of reset noise and the comparator on the quantization operation based on Equations 5 and 6 above.

In step 1810, the controller can connect the second charge storage device with the first charge storage device (e.g., by enabling the capacitor switch) to cause the charge sensing unit to output a second voltage. Specifically, via the connection, charge stored in the first charge storage device (the residual charge, as well as a first portion of the overflow charge if the first charge storage device is not reset), as well as the charged in the second charge storage device (the second portion of the overflow charge), can redistribute between the charge storage devices, and a second voltage may be generated at the parallel combination of the charge storage devices.

In step 1812, the controller can quantize the second voltage to generate a second digital value to measure the overflow charge. Specifically, the quantization can be part of the FD ADC operation by comparing, using comparator 1104, the second voltage against a second voltage ramp. The second voltage ramp can start from $V_{ref\_low}$ to $V_{ref\_high}$. In FD ADC phase, $V_{ref\_high}$ can represent the saturation level of photodiode PD, whereas $V_{ref\_low}$ can represent the minimum detectable quantity of overflow charge, and the polarity of comparison in FD ADC phase can be opposite from PD ADC phase. This can be due to different noise/offset compensation schemes used between FD ADC and PD ADC phases. For example, a different noise/offset compensation scheme as described in Equations 8-10, in which the comparator can be reset followed by the resetting of the charge storage devices when the comparator is out of the reset state, can be used to mitigate the effect of leakage, and the polarity of the comparison can be swapped as a result. Example circuits described in FIG. 14A-FIG. 14C can be used to change the polarity of the comparison between FD ADC and PD ADC operations. When the comparator trips, memory 812 can latch in a count value from counter 811 representing the second digital value. The second digital value can be used to measure the quantity of the overflow charge based on Equations 11-14 above.

In step 1814, the controller can generate a digital representation of the incident light intensity based on the first digital value and the second digital value. As described above, the controller can generate a measurement of the residual charge and a measurement of the overflow charge based on the first digital value (V1) and the second digital value (V2) and based on Equations 11-14 above. Based on whether the photodiode saturates (e.g., based on FLAG_2 signal), the controller can output the measurement of the residual charge or the measurement of the overflow charge to represent the incident light intensity.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
   a photodiode;
   a charge sensing unit including a first charge storage device and a second charge storage device;
   an analog-to-digital converter (ADC); and
   a controller configured to:
      within an exposure period:
         enable the photodiode to, in response to incident light, accumulate residual charge and transfer overflow charge to the first charge storage device and the second charge storage device when the photodiode saturates;
      after the exposure period ends:
         disconnect the second charge storage device from the first charge storage device;
         transfer the residual charge to the first charge storage device to cause the charge sensing unit to generate a first voltage;
         control the ADC to quantize the first voltage to generate a first digital value to measure the residual charge;
         connect the first charge storage device with the second charge storage device to cause the charge sensing unit to generate a second voltage;
         quantize the second voltage to generate a second digital value to measure the overflow charge; and
         generate a digital representation of an intensity of the incident light based on the first digital value, the second digital value, and based on whether the photodiode saturates.

2. The apparatus of claim 1, wherein the apparatus further comprises:
   a first switch coupled between the photodiode and the first charge storage device, the first switch controllable by the controller to transfer the residual charge or the overflow charge from the photodiode; and
   a second switch controllable by the controller to connect the first charge storage device and the second charge storage device in parallel, or to disconnect the second charge storage device from the first charge storage device.

3. The apparatus of claim 2, wherein the controller is configured to, during the exposure period:
   control the second switch to connect the first charge storage device and the second charge storage device in parallel; and
   control the first switch to enable the photodiode to transfer the overflow charge to the first charge storage device and the second charge storage device connected in parallel if the photodiode saturates.

4. The apparatus of claim 3, wherein the controller is configured to:
   control the second switch to disconnect the second charge storage device from the first charge storage device and from the photodiode to enable the first charge storage device to store a first portion of the overflow charge and the second charge storage device to store a second portion of the overflow charge; and
   control the first switch to transfer the residual charge to the first charge storage device to cause the charge sensing unit to generate the first voltage.

5. The apparatus of claim 4, wherein:
   the first voltage is based on a quantity of the residual charge and a quantity of the first portion of the overflow charge and a capacitance of the first charge storage device.

6. The apparatus of claim 5, wherein the second voltage is based on the quantity of the residual charge, the quantity of the overflow charge, and a total capacitance of the first charge storage device and the second charge storage device.

7. The apparatus of claim 4, wherein the controller is configured to empty the first charge storage device prior to transferring the residual charge of the each pixel cell to the first charge storage device; and
wherein the first voltage is based on a quantity of the residual charge and a capacitance of the first charge storage device.

8. The apparatus of claim 7, wherein the second voltage is based on the quantity of the residual charge, a quantity of the second portion of the overflow charge, and a total capacitance of the first charge storage device and the second charge storage device.

9. The apparatus of claim 1, wherein the controller is configured to:
generate a first digital representation of the residual charge and a second digital representation of the overflow charge based on the first digital value, the second digital value, and capacitances of the first charge storage device and of the second charge storage device; and
based on whether the photodiode saturates, generate the digital representation of the intensity of the incident light based on the first digital representation of the residual charge or the second digital representation of the overflow charge.

10. The apparatus of claim 1, further comprising a memory and a counter; wherein:
the ADC comprises a comparator configured to:
compare the first voltage against a first ramping voltage to output a first decision;
obtain the first digital value from the counter based on the first decision;
compare the second voltage against a second ramping voltage to output a second decision;
obtain the second digital value from the counter based on the second decision; and
store both the first digital value and the second digital value in the memory.

11. The apparatus of claim 10, wherein the controller is configured to reset the comparator and the first and second charge storage devices simultaneously prior to comparing the first voltage against the first ramping voltage.

12. The apparatus of claim 11, wherein the controller is configured to reset the comparator, and then reset the first and second charge storage devices when the comparator is out of reset, prior to comparing the second voltage against the second ramping voltage.

13. The apparatus of claim 12, wherein the first ramping voltage and the second ramping voltage have opposite ramping directions.

14. The apparatus of claim 12, wherein a polarity of comparison of the comparator is inverted in the generation of the second digital value with respect to the generation of the first digital value.

15. The apparatus of claim 14, further comprising an input multiplexor controllable to swap inputs to a first input terminal and a second input terminal of the comparator between the generation of the first digital value and the generation of the second digital value to invert the polarity of the comparison.

16. The apparatus of claim 14, further comprising an output multiplexor controllable to invert an output of the comparator between the generation of the first digital value and the generation of the second digital value to invert the polarity of the comparison.

17. A method comprising:
within an exposure period, enabling a photodiode to, in response to incident light, accumulate residual charge, and to transfer overflow charge to a first charge storage device and a second charge storage device when the photodiode saturates;
disconnecting the second charge storage device from the first charge storage device;
enabling the photodiode to transfer the residual charge to the first charge storage device to cause the charge sensing unit to output a first voltage;
quantizing the first voltage to generate a first digital value to measure the residual charge;
connecting the second charge storage device with the first charge storage device to cause the charge sensing unit to output a second voltage;
quantizing the second voltage to generate a second digital value to measure the overflow charge; and
generating a digital representation of the incident light intensity based on the first digital value and the second digital value.

18. The method of claim 17, wherein the method further comprises:
connecting the first charge storage device and the second charge storage device in parallel to receive the overflow charge from the photodiode; and
disconnecting the first charge storage device from the second charge storage device such that the first charge storage device stores a first portion of the overflow charge and the second charge storage device stores a second portion of the overflow charge.

19. The method of claim 18, wherein the residual charge combines with the first portion of the overflow charge to generate the first voltage.

20. The method of claim 18, further comprising emptying the first charge storage device prior to transferring the residual charge of to the first charge storage device, wherein the residual charge is stored at the emptied first charge storage device to generate the first voltage.

* * * * *